(12) United States Patent
Noh et al.

(10) Patent No.: US 12,179,666 B2
(45) Date of Patent: Dec. 31, 2024

(54) DRIVER ASSISTANCE APPARATUS, A VEHICLE, AND A METHOD OF CONTROLLING A VEHICLE

(71) Applicants: HYUNDAI MOTOR COMPANY, Seoul (KR); KIA CORPORATION, Seoul (KR)

(72) Inventors: Min Kyung Noh, Hwaseong-si (KR); Jaeseob Choi, Suwon-si (KR); Yonghun Lee, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/377,207

(22) Filed: Oct. 5, 2023

(65) Prior Publication Data

US 2024/0034236 A1  Feb. 1, 2024

Related U.S. Application Data

(63) Continuation of application No. 17/541,026, filed on Dec. 2, 2021, now Pat. No. 11,813,986.

(30) Foreign Application Priority Data

Dec. 30, 2020 (KR) .......................... 10-2020-0187879

(51) Int. Cl.
*B60R 1/00* (2022.01)
*B60R 11/04* (2006.01)
*G01S 15/931* (2020.01)

(52) U.S. Cl.
CPC ............... *B60R 1/00* (2013.01); *B60R 11/04* (2013.01); *G01S 15/931* (2013.01);
(Continued)

(58) Field of Classification Search
CPC ..... B60R 1/00; B60R 11/04; B60R 2300/105; B60R 2300/301; B60R 2300/303;
(Continued)

(56) References Cited

U.S. PATENT DOCUMENTS

2013/0287304 A1  10/2013  Kimura
2014/0218531 A1*  8/2014  Michiguchi .............. B60R 1/27
                                                        348/148
2017/0341583 A1  11/2017  Zhang et al.

* cited by examiner

*Primary Examiner* — Farzana Hossain
(74) *Attorney, Agent, or Firm* — Lempia Summerfield Katz LLC

(57) ABSTRACT

A vehicle includes a first camera mounted on the vehicle to have a first field of view facing a front or rear of the vehicle and configured to acquire first image data, a second camera mounted on the vehicle to have a second field of view facing a left or right side of the vehicle and configured to acquire second image data, and a display. The vehicle also has a controller configured to display first around-view data in which the first image data and the second image data are combined so that a boundary between the first image data and the second image data becomes a first reference angle on the display. The controller is also configured to combine the first image data and the second image data so that an angle between the boundary and a driving direction of the vehicle becomes a second reference angle greater than the first reference angle based on an opening of a door or trunk lid or gate of the vehicle.

19 Claims, 34 Drawing Sheets

(52) U.S. Cl.
CPC ... *B60R 2300/105* (2013.01); *B60R 2300/301* (2013.01); *B60R 2300/303* (2013.01)

(58) Field of Classification Search
CPC .............. B60R 2300/8093; B60R 1/27; B60R 21/0134; B60R 2300/20; G01S 15/931; G01S 15/86; G01S 15/87; B60W 50/14; B60W 30/08; B60W 40/02; B60W 40/105; B60W 2050/146; B60W 2420/54; B60W 2520/06; B60W 2520/10; B60W 2552/50; B60K 35/00; B60K 2360/21; B60K 35/22; B60K 35/81; H04N 23/57
See application file for complete search history.

DRIVER ASSISTANCE APPARATUS, A VEHICLE, AND A METHOD OF CONTROLLING A VEHICLE

CROSS-REFERENCE TO RELATED APPLICATION(S)

The present application is a continuation of U.S. application Ser. No. 17/541,026 filed Dec. 2, 2021, which claims priority under 35 U.S.C. § 119 to Korean Patent Application No. 10-2020-0187879, filed on Dec. 30, 2020, the entire disclosures of which are incorporated herein by reference.

BACKGROUND

1. Field

The present disclosure relates to a driver assistance apparatus, a vehicle, and a method of controlling the vehicle, and more particularly, to a driver assistance apparatus that assists a driver's vehicle control, a vehicle, and a method of controlling the vehicle.

2. Description of Related Art

Vehicles are the most common means of transportation in modern society, and the number of people using them is increasing. Due to the development of vehicle technology, long-distance movement or travel is easy and life is easier. However, in places with a high population density, road traffic conditions deteriorate and traffic congestion often occurs.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

Examples of the ADAS equipped within the vehicle include Forward Collision Avoidance (FCA), Autonomous Emergency Brake (AEB), and Driver Attention Warning (DAW).

The driver assistance apparatus may assist a driving of the vehicle as well as assist a parking of the vehicle.

SUMMARY

Aspects of the present disclosure are to provide a driver assistance apparatus, a vehicle, and a method of controlling a vehicle that can display an image of surroundings around the vehicle without distortion of a surrounding obstacle during parking.

Therefore, it is an aspect of the present disclosure to provide a vehicle including a first camera mounted on the vehicle to have a first field of view facing a front or rear of the vehicle and configured to acquire first image data, a second camera mounted on the vehicle to have a second field of view facing a left or right side of the vehicle and configured to acquire second image data, a display, and a controller. The controller is configured to display first around-view data in which the first image data and the second image data are combined so that a boundary between the first image data and the second image data becomes a first reference angle on the display. The controller is also configured to combine the first image data and the second image data so that an angle between the boundary and a driving direction of the vehicle becomes a second reference angle greater than the first reference angle based on an opening of the vehicle door The controller may be configured to combine the first image data and the second image data so that an angle between the boundary and a driving direction of the vehicle becomes a second reference angle less than the first reference angle based on a driving speed of the vehicle being equal to or greater than a reference speed.

The controller may be configured to determine an obstacle is located nearby the vehicle within a view of the first camera and/or the second camera. The controller may also be configured to, in response to the determination, display first around-view data in which the first image data and the second image data are combined so that the boundary between the first image data and the second image data becomes a second reference angle on the display based on the obstacle located nearby the vehicle.

The controller may be configured to combine the first image data and the second image data so that an area occupied by the first image data in the first around-view data is expanded based on the obstacle located in the first field of view.

The controller may be configured to combine the first image data and the second image data so that an area occupied by the second image data in the second around-view data is expanded based on the obstacle located in the second field of view.

The first camera may have the first field of view facing a first direction and the second camera may have the second field of view facing a second direction. The controller may be configured to combine the first image data and the second image data so that the boundary faces the second direction based on the obstacle located in the first field of view.

The first camera may have the first field of view facing a first direction and the second camera may have the second field of view facing a second direction. The controller may be configured to combine the first image data and the second image data so that the boundary faces the first direction based on the obstacle located in the second field of view.

The controller may be configured to combine the first image data and the second image data so that an angle between the boundary and a driving direction of the vehicle becomes a second reference angle greater than the first reference angle based on the obstacle located in front or rear of the vehicle.

The controller may be configured to combine the first image data and the second image data so that an angle between the boundary and a driving direction of the vehicle becomes a second reference angle less than the first reference angle based on the obstacle located in right side or left side of the vehicle.

The controller may be configured to combine the first image data and the second image data so that an angle between the boundary and a driving direction of the vehicle becomes a second reference angle less than the first reference angle based on an opening of a trunk gate or trunk lid of the vehicle.

The vehicle may include a first ultrasound sensor mounted on the vehicle to have a first detection area overlapping the first field of view and configured to detect the obstacle. The vehicle may also have a second ultrasound sensor mounted on the vehicle to have a second detection area overlapping the second field of view and configured to detect the obstacle.

The controller may be configured to combine the first image data and the second image data so that an area occupied by the first image data in the second around-view data is expanded based on a determination that the obstacle is detected by the first ultrasound sensor.

The controller may be configured to combine the first image data and the second image data so that an area occupied by the second image data in the second around-view data is expanded based on a determination that the obstacle is detected by the second ultrasound sensor.

The first ultrasound sensor may have a first detection area facing a front or rear of the vehicle and the second ultrasound sensor may have a second detection area facing a left or right side of the vehicle.

The controller may be configured to combine the first image data and the second image data so that an angle between the boundary and a driving direction of the vehicle becomes a second reference angle greater than the first reference angle based on a determination that the obstacle is detected by the first ultrasound sensor.

The controller may be configured to combine the first image data and the second image data so that an angle between the boundary and a driving direction of the vehicle becomes a second reference angle less than the first reference angle based on a determination that the obstacle is detected by the second ultrasound sensor.

It is another aspect of the present disclosure to provide a vehicle including a first camera mounted on the vehicle to have a first field of view facing a front or rear of the vehicle and configured to acquire first image data, a second camera mounted on the vehicle to have a second field of view facing a left or right side of the vehicle and configured to acquire second image data, a display, and a controller. The controller is configured to display first around-view data in which the first image data and the second image data are combined so that a boundary between the first image data and the second image data becomes a first reference angle on the display. The controller is also configure to combine the first image data and the second image data so that an angle between the boundary and a driving direction of the vehicle becomes a second reference angle less than the first reference angle based on an opening of a trunk lid or trunk gate of the vehicle.

The controller may be configured to combine the first image data and the second image data so that an angle between the boundary and a driving direction of the vehicle becomes a second reference angle less than the first reference angle based on a driving speed of the vehicle being equal to or greater than a reference speed.

The controller may be configured to determine an obstacle is located nearby the vehicle within a view of the first camera and/or second camera. The controller may also be configured to, in response to the determination, display first around-view data in which the first image data and the second image data are combined so that the boundary between the first image data and the second image data becomes a second reference angle on the display based on the obstacle located nearby the vehicle.

The controller may be configured to combine the first image data and the second image data so that an area occupied by the first image data in the first around-view data is expanded based on the obstacle located in the first field of view.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
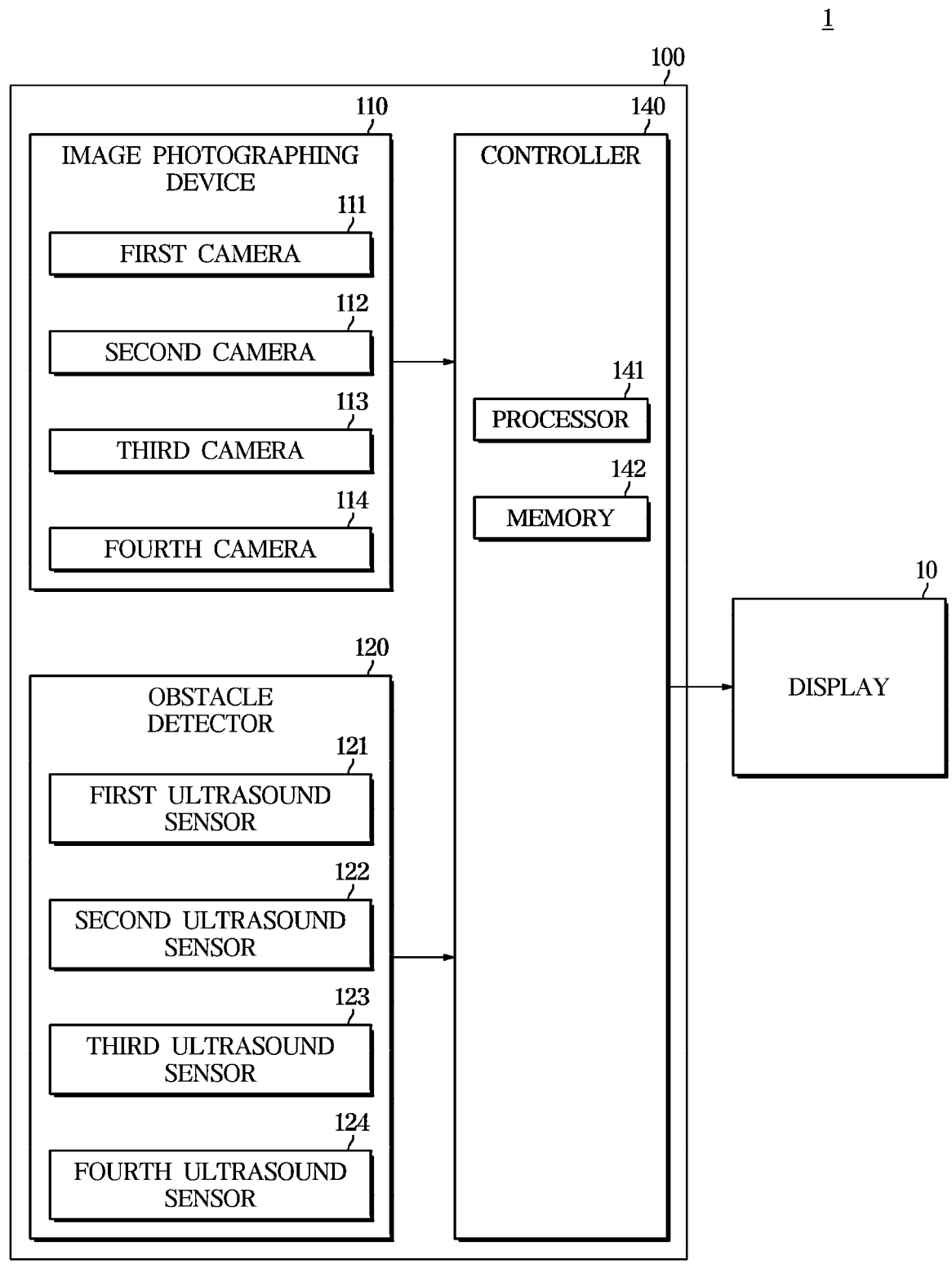
FIG. 1 is a view illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein should be apparent to those of ordinary skill in the art.

The progression of processing operations described is an example. However, the sequence of and/or operations is not limited to that set forth herein and may be changed, with the exception of operations necessarily occurring in a particular order. In addition, respective descriptions of well-known functions and constructions have been omitted for increased clarity and conciseness.

Additionally, embodiments are now described more fully hereinafter with reference to the accompanying drawings. The embodiments may, however, be embodied in many different forms and should not be construed as being limited to the embodiments set forth herein. These embodiments are provided so that this disclosure is thorough and complete and fully conveys the embodiments to those of ordinary skill in the art. Like numerals denote like elements throughout.

It should be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It should be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference is now made in detail to the embodiments of the present disclosure, examples of which are illustrated in the accompanying drawings, wherein like reference numerals refer to like elements throughout the present disclosure.

The expression, "at least one of a, b, and c," should be understood as including only a, only b, only c, both a and b, both a and c, both b and c, or all of a, b, and c.

When a component, device, element, or the like of the present disclosure is described as having a purpose or performing an operation, function, or the like, the component, device, or element should be considered herein as being "configured to" meet that purpose or to perform that operation or function.

Figure 2:
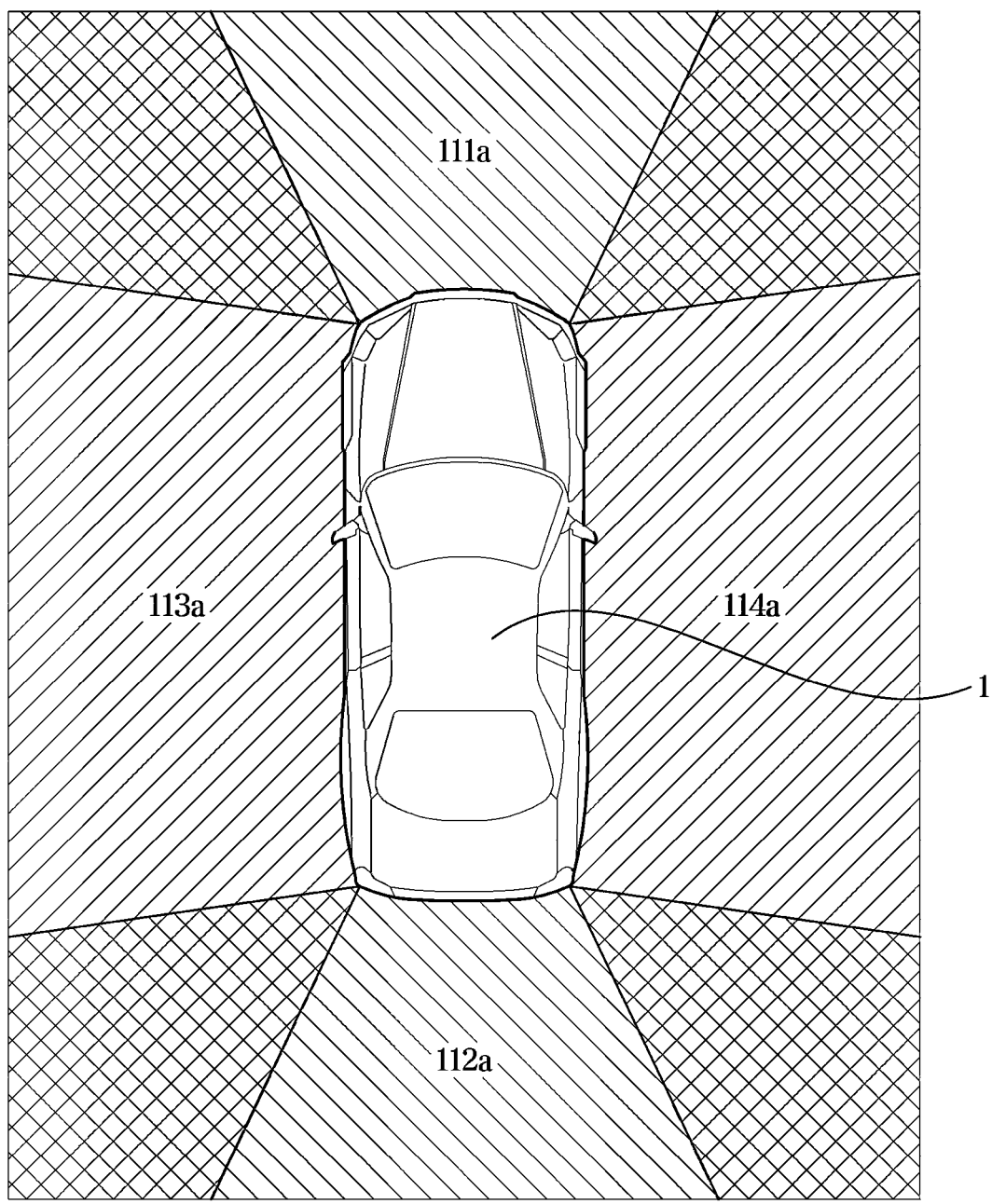
FIG. 2 illustrates a field of view of cameras installed in a vehicle according to an embodiment.
Figure 3:
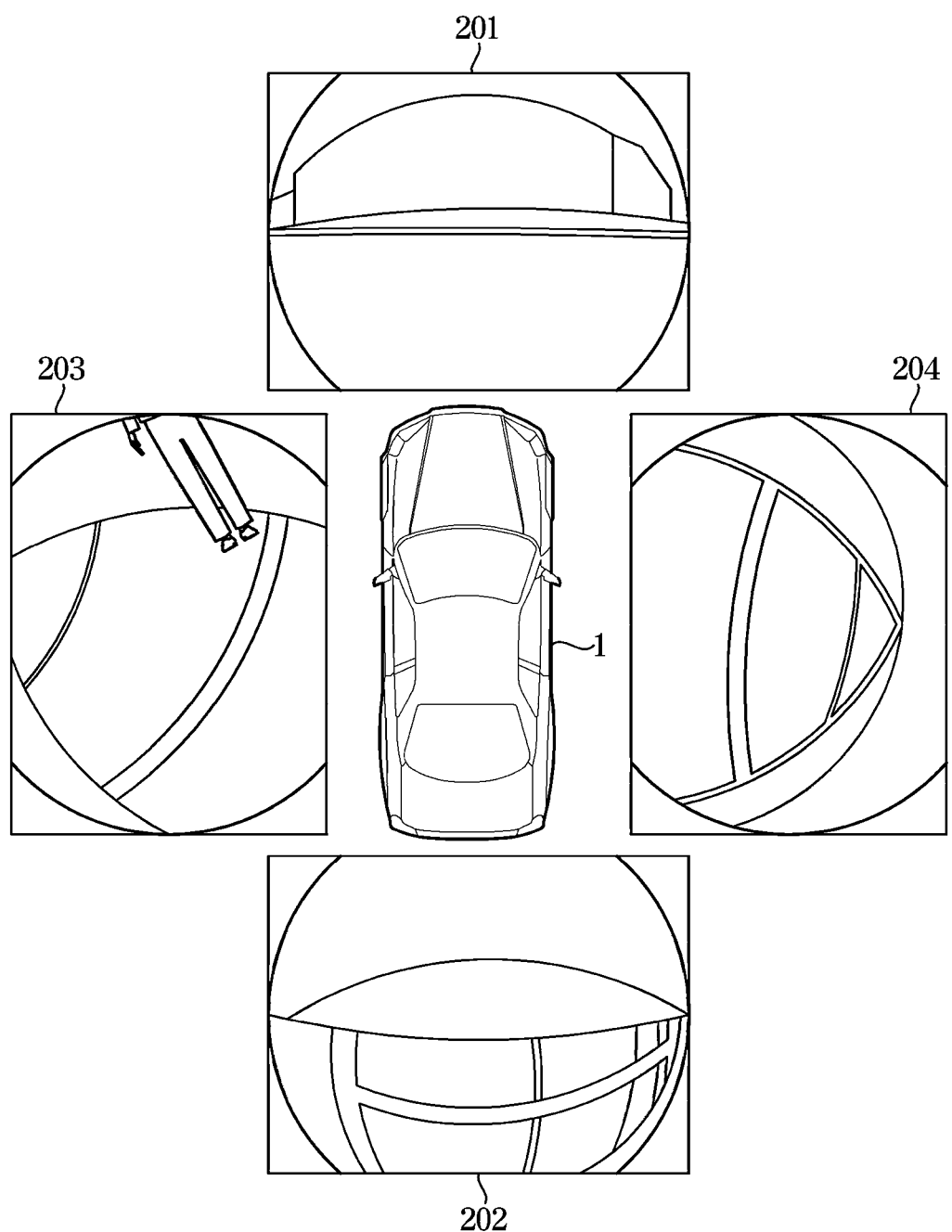
FIG. 3 illustrates image data photographed by a camera included in a driver assistance apparatus according to an embodiment.
Figure 4:
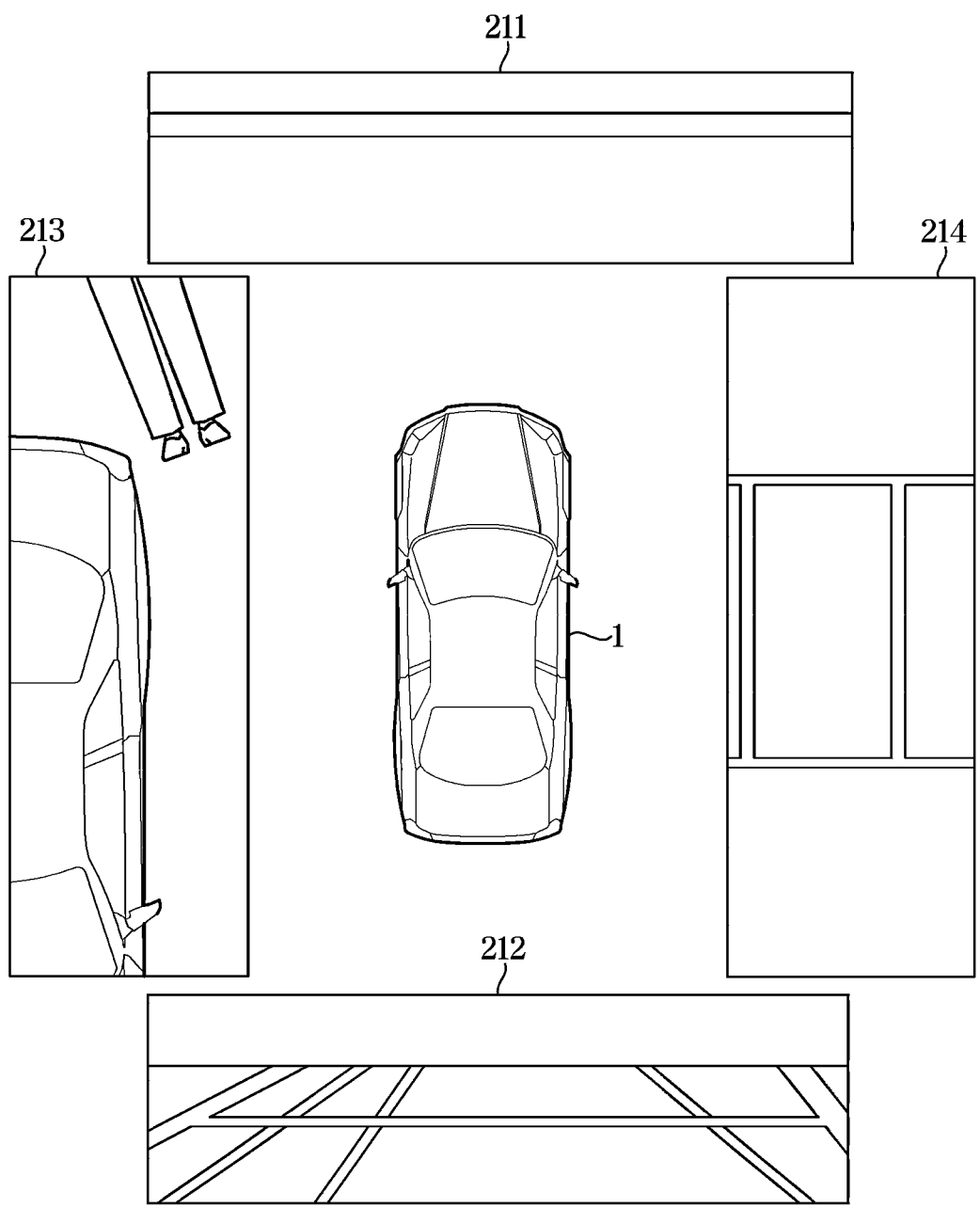
FIG. 4 illustrates image data corrected by a driver assistance apparatus according to an embodiment.
Figure 5:
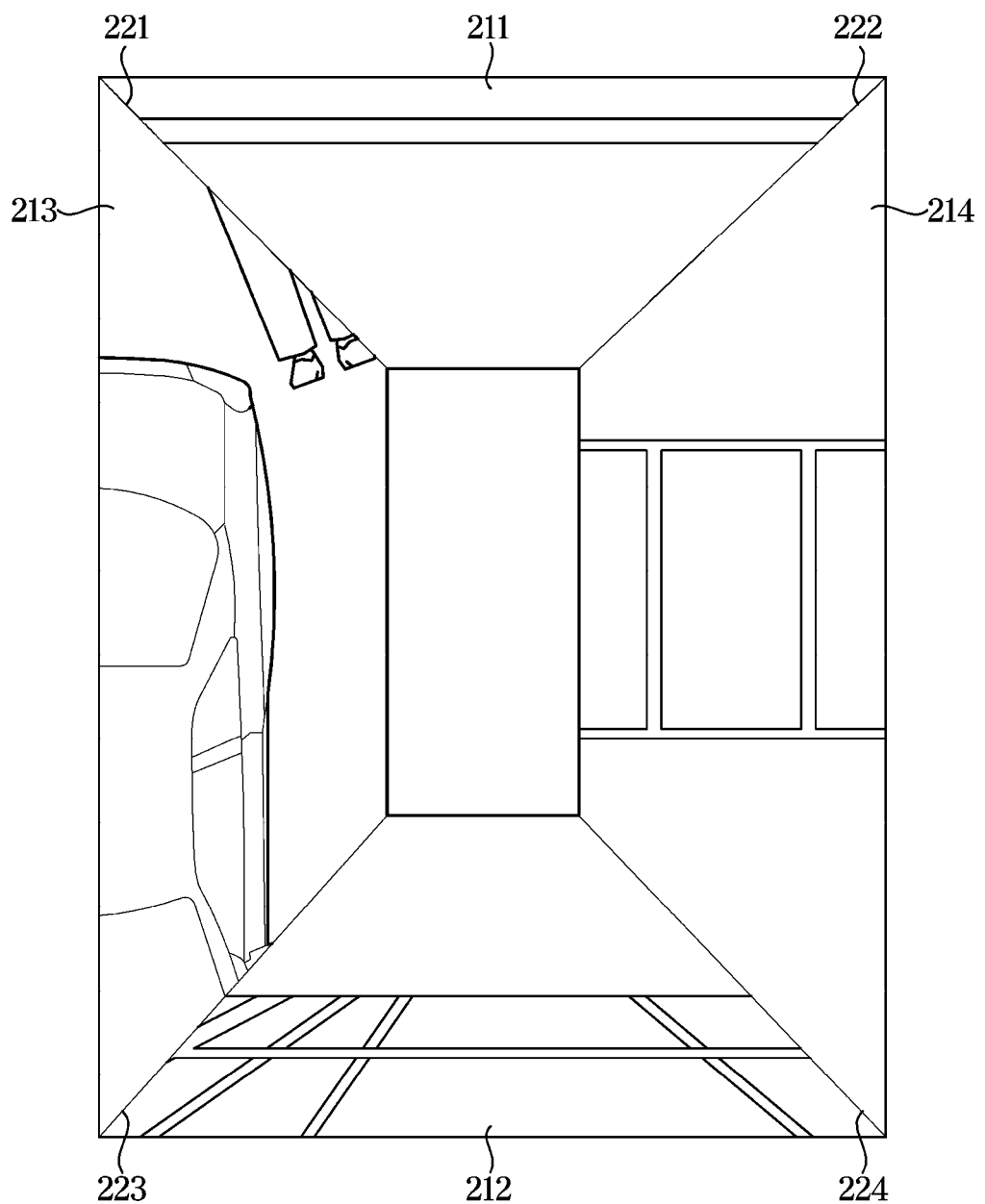
FIG. 5 illustrates an example of image data combined by a driver assistance apparatus according to an embodiment.

FIG. 1 is a view illustrating a configuration of a vehicle according to an embodiment. FIG. 2 illustrates a field of view of cameras installed in a vehicle according to an embodiment. FIG. 3 illustrates image data photographed by a camera included in a driver assistance apparatus according to an embodiment. FIG. 4 illustrates image data corrected by a driver assistance apparatus according to an embodiment. FIG. 5 illustrates an example of image data combined by a driver assistance apparatus according to an embodiment. FIGS. 6A, 6B, 6C, and 6D illustrate various examples of image data combined by a driver assistance apparatus according to an embodiment.

As shown in FIG. 1, a vehicle 1 includes a display 10 for displaying operation information and a driver assistance apparatus 100 for assisting a driver.

The display 10 may include a cluster and a multimedia player.

The cluster may be provided in front of the driver and may display driving information of the vehicle 1 including the driving speed of the vehicle 1, the revolutions per minute (RPM) of the engine and/or the amount of fuel, and the like. Also, the cluster may display an image provided from the driver assistance apparatus 100.

The multimedia player may display an image (or moving image) for the convenience and fun of the driver. Also, the multimedia player may display an image provided from the driver assistance apparatus 100.

The driver assistance apparatus 100 includes an image photographing device 110 that photographs images around the vehicle 1 and acquires image data. The driver assistance apparatus 100 also includes an obstacle detector 120 that detects obstacles around the vehicle 1 without contact. The driver assistance apparatus 100 also includes a controller 140 for controlling the operation of the driver assistance apparatus 100 based on the output of the image photographing device 110 and the output of the obstacle detector 120. Here, the obstacle is an object that interferes with the driving of the vehicle 1 and the obstacle may include, for example, a vehicle, a pedestrian, a structure on a road, and the like.

The image photographing device 110 includes a first camera 111, a second camera 112, a third camera 113, and a fourth camera 114.

The first camera 111 may photograph the front of the vehicle 1 and acquire first image data of the front of the vehicle 1.

The first camera 111 may have a first field of view (FOV) 111a facing the front of the vehicle 1 as shown in FIG. 2. For example, the first camera 111 may be installed on a front windshield of the vehicle 1 or a grille of the vehicle 1.

The first camera 111 may include a plurality of lenses and an image sensor. The image sensor may include a plurality of photodiodes for converting light into electrical signals, and the plurality of photodiodes may be arranged in a two-dimensional matrix.

The first camera 111 may be electrically connected to the controller 140. For example, the first camera 111 may be connected to the controller 140 through a vehicle communication network NT, may be connected to the controller 140 through a hard wire, or may be connected to the controller 140 through a signal line of a printed circuit board (PCB).

The first camera 111 may provide first image data in front of the vehicle 1 to the controller 140.

The second camera 112 may photograph the rear of the vehicle 1 and acquire second image data of the rear of the vehicle 1.

The second camera 112 may have a second field of view 112a facing the rear of the vehicle 1 as shown in FIG. 2. For example, the second camera 112 may be installed in a tailgate of the vehicle 1.

The second camera 112 may be electrically connected to the controller 140 and may provide second image data of the rear of the vehicle 1 to the controller 140.

The third camera 113 may photograph the left side of the vehicle 1 and acquire third image data on the left side of the vehicle 1.

The third camera 113 may have a third field of view 113a facing the left side of the vehicle 1 as shown in FIG. 2. For example, the third camera 113 may be installed on a left rear view mirror of the vehicle 1.

The third camera 113 may be electrically connected to the controller 140 and may provide third image data on the left side of the vehicle 1 to the controller 140.

The fourth camera 114 may photograph the right side of the vehicle 1 and acquire fourth image data on the right side of the vehicle 1.

The fourth camera 114 may have a third field of view 114a facing the right side of the vehicle 1 as shown in FIG. 2. For example, the fourth camera 114 may be installed on the right rear view mirror of the vehicle 1.

The fourth camera 114 may be electrically connected to the controller 140 and may provide fourth image data on the right side of the vehicle 1 to the controller 140.

As shown in FIG. 2, the first field of view 111a of the first camera 111, the second field of view 112a of the second camera 112, the third field of view 113a of the third camera 113 and the fourth field of view 114a of the fourth camera 114 may overlap each other. For example, the left end of the first field of view 111a of the first camera 111 overlaps the front end of the third field of view 113a of the third camera 113, and the right end of the first field of view 111a of the first camera 111 may overlap with the front end of the fourth field of view 114a of the fourth camera 114. In addition, the left end of the second field of view 112a of the second camera 112 overlaps the rear end of the third field of view 113a of the third camera 113, and the right end of the second field of view 112a of the second camera 112 may overlap the rear end of the fourth field of view 114a of the fourth camera 114.

The obstacle detector 120 includes a first ultrasound sensor 121, a second ultrasound sensor 122, a third ultrasound sensor 123, and a fourth ultrasound sensor 124.

The first ultrasound sensor 121 may detect an obstacle positioned in front of the vehicle 1 and may output first detection data indicating whether the obstacle is detected and the location of the obstacle. The first ultrasound sensor 121 may include a transmitter that transmits ultrasound toward the front of the vehicle 1 and a receiver that receives ultrasound reflected from an obstacle positioned in front of the vehicle 1. For example, the first ultrasound sensor 121 may include a plurality of transmitters provided in front of the vehicle 1 or a plurality of receivers provided in front of the vehicle 1 in order to identify the location of an obstacle in front of the vehicle 1.

The first ultrasound sensor 121 may be electrically connected to the controller 140. For example, the ultrasound sensor 121 may be connected to the controller 140 through the vehicle communication network (NT), connected to the controller 140 through a hard wire, or connected to the controller 140 through a signal line of a printed circuit board.

The first ultrasound sensor 121 may provide the first detection data of the front of the vehicle 1 to the controller 140.

The second ultrasound sensor 122 may detect an obstacle in the rear of the vehicle 1 and output second detection data of the rear of the vehicle 1. For example, the second ultrasound sensor 122 may include a plurality of transmitters provided at the rear of the vehicle 1 or a plurality of receivers provided at the rear of the vehicle 1 in order to identify the location of the obstacle in the rear of the vehicle 1.

The second ultrasound sensor 122 may be electrically connected to the controller 140 and may provide second detection data of the rear of the vehicle 1 to the controller 140.

The third ultrasound sensor 123 may detect an obstacle of the left side of the vehicle 1 and output third detection data of the left side of the vehicle 1. For example, the third ultrasound sensor 123 may include a plurality of transmitters provided on the left side of the vehicle 1 or a plurality of receivers provided on the left side of the vehicle 1 in order to identify the location of the obstacle of the left side of the vehicle 1.

The third ultrasound sensor 123 may be electrically connected to the controller 140 and may provide third detection data of the left side of the vehicle 1 to the controller 140.

The fourth ultrasound sensor 124 may detect an obstacle of the right side of the vehicle 1 and output fourth detection data of the right side of the vehicle 1. For example, the fourth ultrasound sensor 124 may include a plurality of transmitters provided on the right side of the vehicle 1 or a plurality of receivers provided on the right side of the vehicle 1 to identify the location of the obstacle on the right side of the vehicle 1.

The fourth ultrasound sensor 124 may be electrically connected to the controller 140 and may provide the fourth detection data of the right side of the vehicle 1 to the controller 140.

The controller 140 may be electrically connected to a plurality of cameras 111, 112, 113, and 114 included in the image photographing device 110 and a plurality of ultrasound sensors 121, 122, 123, and 124 included in the obstacle detector 120. In addition, the controller 140 may be connected to the display 10 of the vehicle 1 through communication for the vehicle.

The controller 140 may include a processor 141 and a memory 142. The controller 140 may include, for example, one or more processors or one or more memories. Each of the processor 141 and the memory 142 may be implemented as a separate semiconductor device or may be implemented as a single semiconductor device.

The processor 141 may include one chip (or core) or may include a plurality of chips (or cores). For example, the processor 141 may include a digital signal processor that processes the detecting data of the first and second radars 110 and 120, and/or the processor 141 may include a micro control unit (MCU) that generates a driving signal/braking signal/steering signal.

The processor 141 receives a plurality of detection data from the plurality of ultrasound sensors 121, 122, 123, and 124 and identifies whether an obstacle is located around the vehicle 1 based on the received detection data and identifies the location of the obstacle. For example, the processor 141 may identify whether the obstacle is located in front or rear or on the left or right side of the vehicle 1. Further, the processor 141 may identify an obstacle located in the left front of the vehicle 1, an obstacle located in the right front of the vehicle 1, an obstacle located in the left rear of the vehicle 1, and an obstacle located in the right rear side of the vehicle 1.

The processor 141 receives a plurality of image data 201, 202, 203, and 204 from a plurality of cameras 111, 112, 113 and 114 and may generate an around-view image representing the surroundings of the vehicle 1 by using the received image data 201, 202, 203, and 204. For example, the processor 141 may correct the image data 201, 202, 203, and 204 received from the plurality of cameras 111, 112, 113 and 114 to the top-view data 211, 212, 213, and 214 and may generate the around-view data 220 by combining the top-view data 211, 212, 213, and 214.

The memory 142 processes the detection data of the ultrasound sensors 121, 122, 123, 124 and the image data 201, 202, 203, 204 of the cameras 111, 112, 113, and 114 and may store programs and data for controlling the operation of the driver assistance apparatus 100.

The memory 142 may include a volatile memory, such as a Static Random Access Memory (S-RAM) and a Dynamic Random Access Memory (D-RAM), and a non-volatile memory, such as a Read Only Memory (ROM) and an Erasable Programmable Read Only Memory (EPROM). The memory 142 may include one memory device or may include a plurality of memory devices.

As described above, the controller 140 may identify an obstacle around the vehicle 1 and generate an around-view image around the vehicle 1 by the program and data stored in the memory 142 and the operation of the processor 141.

Specifically, the first, second, third, and fourth cameras 111, 112, 113, and 114 may provide the first, second, third, and fourth image data 201, 202, 203, and 204 as shown in FIG. 3 to the controller 140.

Each of the first, second, third, and fourth cameras 111, 112, 113, and 114 may include, for example, a fisheye lens in order to expand a photographable field of view. Accordingly, the first, second, third, and fourth image data 201, 202, 203 and 204 photographed by the first, second, third, and fourth cameras 111, 112, 113, and 114, respectively may be a fisheye-view as shown in FIG. 3. For example, in the first, second, third, and fourth image data 201, 202, 203, and 204, the height of the center portion of the image and the height of the left and right edge portions of the image may be different from each other.

The controller 140 may correct the fisheye-view image data 201, 202, 203, and 204 into top-view image data. For example, the controller 140 may correct the fisheye-view image data 201, 202, 203, and 204 to the top-view data 211, 212, 213, and 214 using a de-warping algorithm.

As shown in FIG. 4, the controller 140 may correct the first, second, third, and fourth image data 201, 202, 203, and 204 to the first, second, third, and fourth top-view data 211, 212, 213, and 214.

The controller 140 may generate around-view data 220 around the vehicle 1 as shown in FIG. 5 by combining a plurality of top-view data 211, 212, 213, 214.

The controller 140 may correct the first, second, third, and fourth top-view data 211, 212, 213, and 214.

For example, the controller 140 cuts the first, second, third, and fourth top-view data 211, 212, 213, and 214 into a substantially trapezoidal shape and then may combine the cut top-view data 211, 212, 213, and 214 as shown in FIG. 5. As shown in FIG. 5, the first top-view data 211 and the second top-view data 212 are cut so that the angle between the base and the hypotenuse (hereinafter referred to as "the angle of the hypotenuse") is 34 degrees. The third top-view data 213 and the fourth top-view data 214 may be cut so that the angle between the base and the hypotenuse (hereinafter, referred to as "the angle of the hypotenuse") is 56 degrees.

The controller 140 may combine the cut top-view data 211, 212, 213, and 214 so that hypotenuses of the cut top-view data 211, 212, 213, and 214 face each other. The around-view data 220 may be generated by combining the cut top-view data 211, 212, 213, and 214.

In this case, the around-view data 220 may include a plurality of boundaries 221, 222, 223, and 224 in which the cut top-view data 211, 212, 213, and 214 are combined. The plurality of boundaries 221, 222, 223, and 224 may include a first boundary 221 in which the first top-view data 211 and the third top-view data 213 are combined, a second boundary 222 in which the first top-view data 211 and the fourth top-view data 214 are combined, a third boundary 223 in which the second top-view data 212 and the third top-view data 213 are combined, and a fourth boundary 224 in which the second top-view data 212 and the fourth top-view data 214 are combined. The angle between the longitudinal axis of the vehicle 1 (the axis extending in the front-rear direction of the vehicle) and the first boundary 221 (hereinafter referred to as "the angle of the first boundary") and an angle between the longitudinal axis of the vehicle 1 and the second boundary 222 (hereinafter, referred to as an "angle of the second boundary") may be a first reference angle (e.g., 56 degrees). In addition, the angle between the longitudinal axis of the vehicle 1 and the third boundary 223 (hereinafter referred to as "the angle of the third boundary") and the angle between the longitudinal axis of the vehicle 1 and the fourth boundary 224 (hereinafter referred to as "angle of the fourth boundary") may also be the first reference angle (e.g., 56 degrees).

The controller 140 may transmit the around-view data 220 to the display 10 so that the around-view image is displayed on the display 10.

As described above, when the first, second, third, and fourth top-view data 211, 212, 213, and 214 are corrected to have a hypotenuse of a predetermined angle, the obstacle 2 may not be displayed properly.

For example, as shown in FIG. 5, when the obstacle 2 is located on the front left side of the vehicle 1, an image information about the obstacle 2 may be removed by correction (cutting) of the first top-view data 211 of the vehicle 1 and correction (cutting) of the third top-view data 213. In other words, the obstacle 2 may not be displayed in the around-view data (220).

To prevent obstacle 2 from not being displayed in around-view data (220) like this, the controller 140 may correct the first, second, third, and fourth top-view data 211, 212, 213, and 214 based on whether an obstacle is located around the vehicle 1 and the location of the obstacle.

When an obstacle is located around the vehicle 1, the controller 140 may correct (cut) the image data so that the area occupied by image data (top-view data) indicating the area where the obstacle is located is expanded.

Figure 6A:
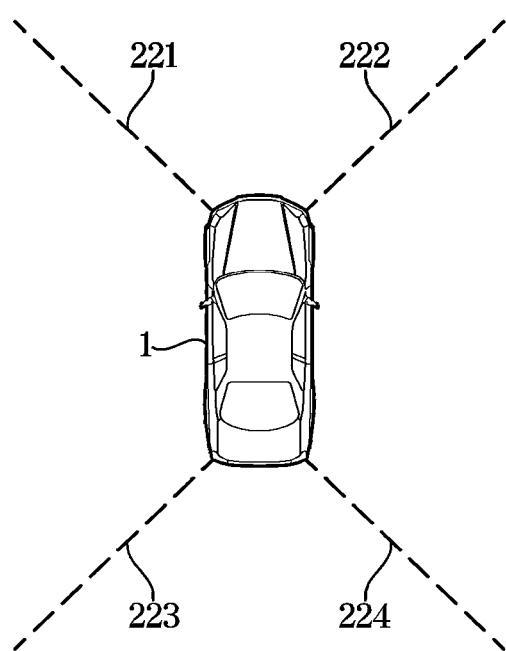
FIGS. 6A, 6B, 6C, and 6D illustrate various examples of image data combined by a driver assistance apparatus according to an embodiment.

For example, if an obstacle is not located around the vehicle 1 as shown in FIG. 6A, the controller 140 may correct the top-view data 211, 212, 213, and 214 to have a hypotenuse of a predetermined reference angle (e.g., 34 degrees or 56 degrees).

Figure 6B:
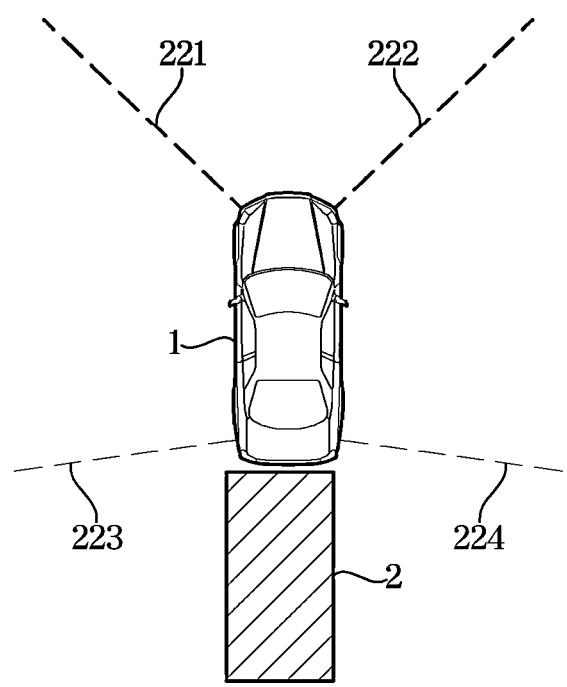

As another example, as shown in FIG. 6B, if the obstacle 2 is located in the rear of the vehicle 1, the controller 140 may correct the top-view data 211, 212, 213, and 214 so that the second top-view image representing the rear of the vehicle 1 in the around-view image is expanded. The controller 140 may correct the second top-view data 212 so that the angle of the hypotenuse of the second top-view image is changed (eg, changed to 10 degrees). Also, the controller 140 may correct the third top-view data 213 and the fourth top-view data 214 so that the angle of the hypotenuse of the third top-view image and the fourth top-view image is changed (eg, changed to 80 degrees). In the around-view image, the angle of the third boundary 223 and the angle of the fourth boundary 224 may be changed to a second reference angle (eg, 80 degrees). In other words, the third boundary 223 may be inclined toward the left side of the vehicle 1, and the fourth boundary 224 may be inclined toward the right side of the vehicle 1. By such a structure, the area of the image photographed by the second camera 112 installed at the rear of the vehicle 1 in the around-view image can be expanded, and the obstacle 2 located at the rear of the vehicle 1 can be displayed on the around-view image without distortion.

Figure 6C:
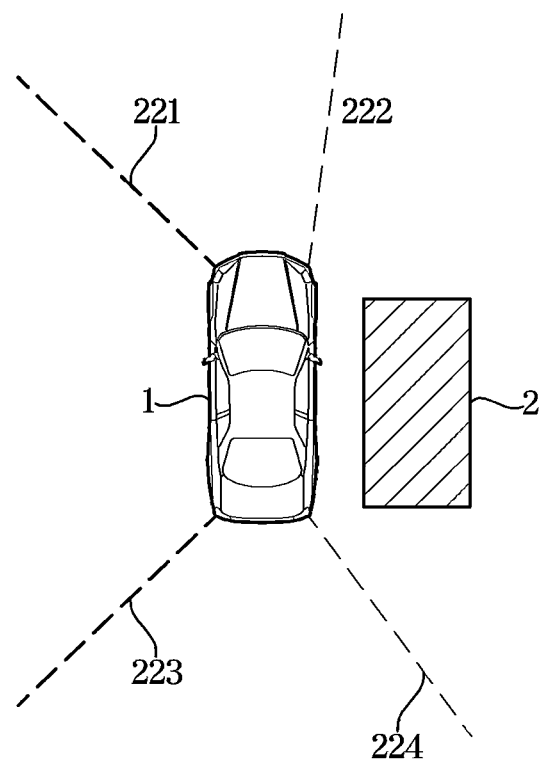

As another example, as shown in FIG. 6C, if the obstacle 2 is located on the right side of the vehicle 1, the controller 140 may correct the top-view data 211, 212, 213, and 214 so that the fourth top-view image representing the right side of the vehicle 1 in the around-view image is expanded. The controller 140 may correct the fourth top-view data 214 so that the angle of the hypotenuse of the fourth top-view image is changed (e.g., changed to 10 degrees). Also, the controller 140 may correct the first top-view data 211 and the second top-view data 212 so that the hypotenuse angles of the first top-view image and the second top-view image are changed (e.g., changed to 80 degrees). In the around-view image, the angle of the second boundary 222 and the angle of the fourth boundary 224 may be changed to a third reference angle (e.g., 10 degrees). In other words, the second boundary 222 may be inclined toward the front of the vehicle 1, and the fourth boundary 224 may be inclined toward the rear of the vehicle 1. By such a structure, the area of the image photographed by the fourth camera 114 installed on the right side of the vehicle 1 in the around-view image can be expanded, and the obstacle 2 located on the right side of the vehicle 1 can be displayed on the around-view image without distortion.

Figure 6D:
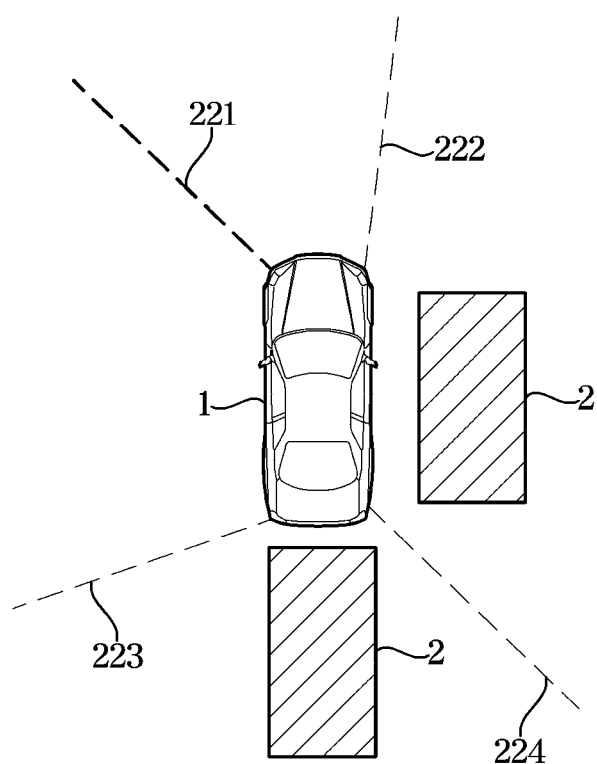

As another example, as shown in FIG. 6D, if the obstacle 2 is located on the rear and right side of the vehicle 1, the controller 140 may correct the top-view data so that the second top-view image representing the rear of the vehicle 1 and the fourth top-view image representing the right side of the vehicle 1 are expanded in the around-view image. In the around-view image, the angle of the second boundary 222 may be changed to a third reference angle (e.g., 10 degrees), and the angle of the third boundary 223 may be changed to a second reference angle (e.g., 80 degrees). The angle of the fourth boundary 224 in which the second top-view data 212 and the fourth top-view data 214 are in contact may maintain a first reference angle (e.g., 56 degrees). In other words, the second boundary 222 may be inclined toward the front of the vehicle 1, and the third boundary 223 may be inclined toward the right side of the vehicle 1. By such a structure, the area of the image photographed by the second camera 112 and the fourth camera 114 installed on the right side of the vehicle 1 in the around-view image can be expanded, and the obstacles 2 located on the rear and right sides of the vehicle 1 can be displayed on the around-view image without distortion.

As described above, the controller 140 may generate around-view data 220 based on the detected obstacle, and transmit the around-view data 220 to the display 10 to display the around-view image.

Various embodiments of generating around-view data 220 are described below.

Figure 7A:
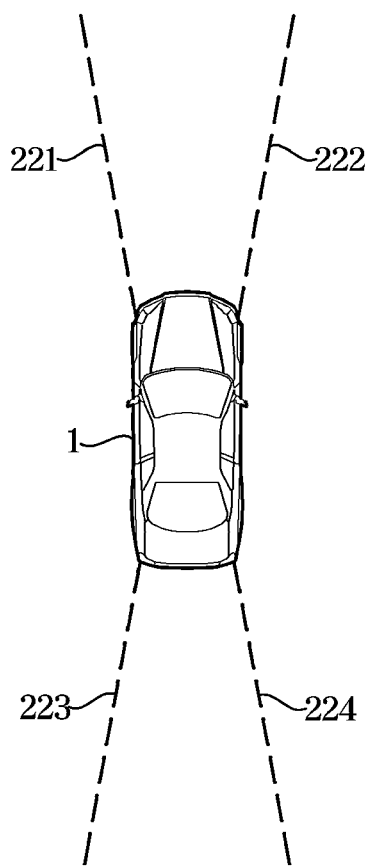
FIGS. 7A and 7B illustrate an example of around-view data generated by a driver assistance apparatus according to an embodiment while a vehicle is parked and while driving.
Figure 7B:
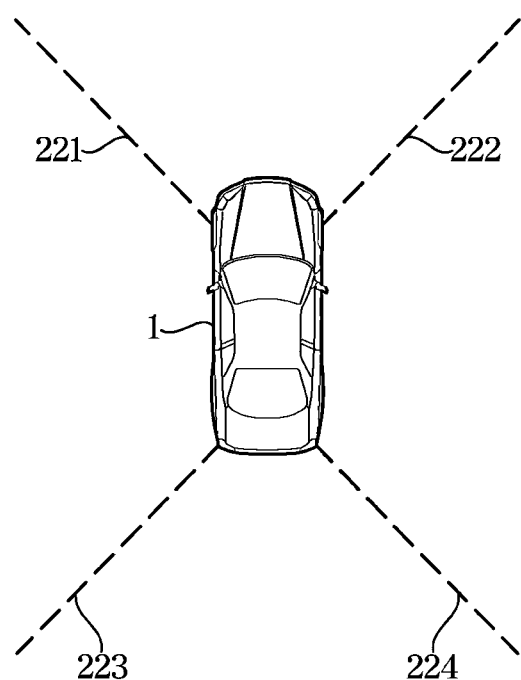

FIGS. 7A and 7B illustrate an example of around-view data generated by a driver assistance apparatus according to an embodiment while a vehicle is parked and while driving.

If vehicle 1 is parked or the driving speed is less than the reference speed, the driver assistance apparatus 100 may generate around-view data 220 by combining image data photographed by the first, second, third, and fourth cameras 111, 112, 113, and 114. The driver assistance apparatus 100 may set angles of the first, second, third, and fourth boundaries 221, 222, 223, and 224 of the around-view data 220 as a first reference angle (e.g., 56 degrees) as shown in FIG. 7A.

If the driving speed of vehicle 1 is greater than or equal to the reference speed, the driver assistance apparatus 100 may set the angles of the first, second, third, and fourth boundaries 221, 222, 223, and 224 of the around-view data 220 as a third reference angle (e.g., 10 degrees) as shown in FIG. 7B.

When the door of the vehicle 1 is opened while the vehicle 1 is parked, the driver assistance apparatus 100 may set the angles of the first, second, third, and fourth boundaries 221, 222, 223, and 224 as second reference angle (e.g., 80 degrees).

In addition, if the trunk gate of the vehicle 1 is opened while the vehicle 1 is parked, the driver assistance apparatus 100 may set the angles of the first boundary 221 and the second boundary 222 in front of the vehicle 1 as a second reference angle (e.g., 80 degrees) and set the angles of the third boundary 223 and the fourth boundary 224 at the rear of the vehicle 1 as a third reference angle (e.g., 10 degrees).

Figure 8A:
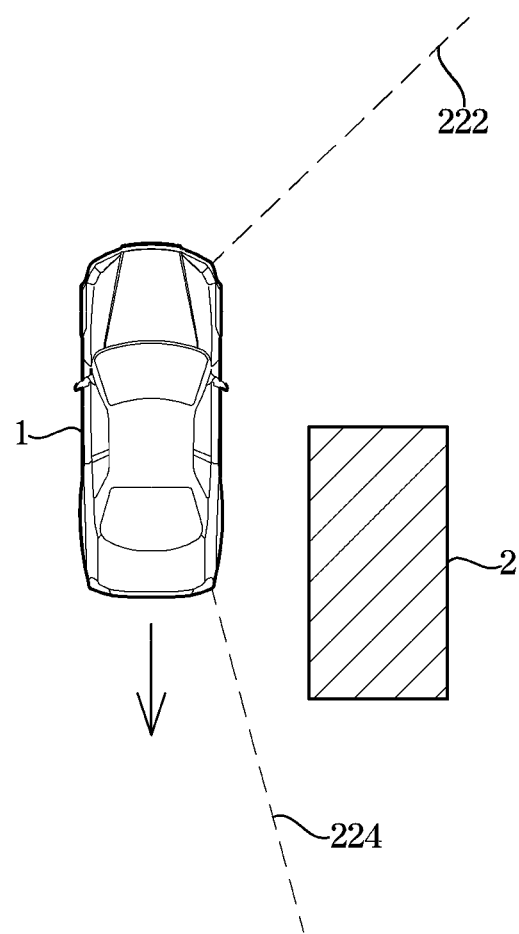
FIGS. 8A and 8B illustrate an example of around-view data generated by a driver assistance apparatus according to an embodiment while a vehicle is moving.
Figure 8B:
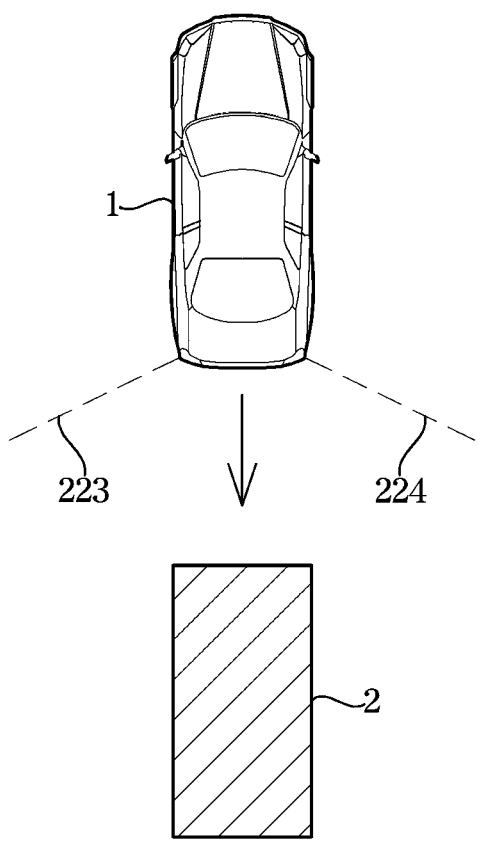
Figure 9A:
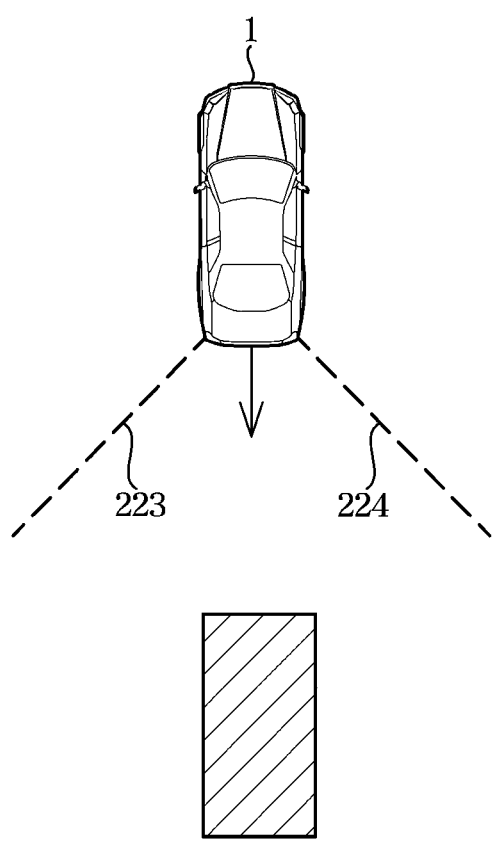
FIGS. 9A, 9B, and 9C illustrate an example of around-view data generated by a driver assistance apparatus according to an embodiment while a vehicle is moving.
Figure 9B:
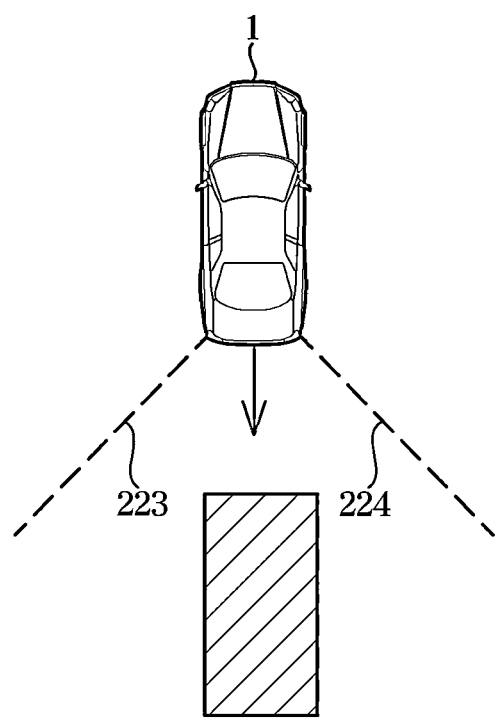
Figure 9C:
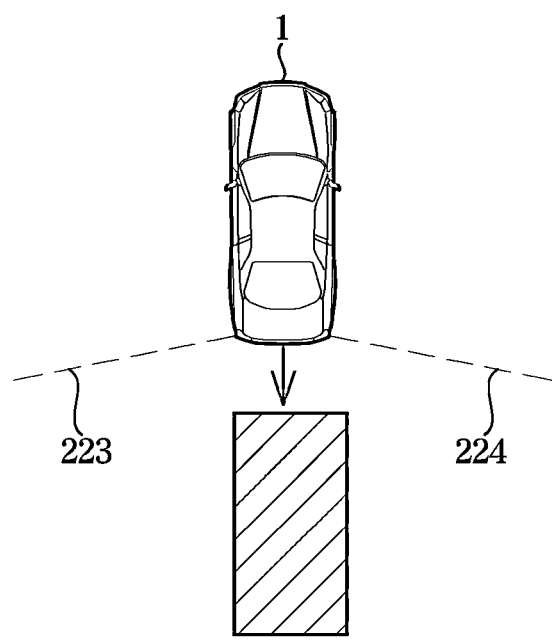

FIGS. 8A and 8B illustrate an example of around-view data generated by a driver assistance apparatus according to an embodiment while a vehicle is moving. FIGS. 9A, 9B, and 9C illustrate an example of around-view data generated by a driver assistance apparatus according to an embodiment while a vehicle is moving.

While the vehicle 1 is moving backward, the driver assistance apparatus 100 may detect an obstacle 2 located at the right rear side of the vehicle 1 based on detection data of ultrasound sensors 121, 122, 123, and 124.

The driver assistance apparatus 100 may generate around-view data 220 such that a region of the right image photographed by the fourth camera 114 in the around-view image is expanded based on the detection of the obstacle 2 located in the rear right of the vehicle 1. For example, as shown in FIG. 8A, the driver assistance apparatus 100 maintains the angle of the first boundary 221, the angle of the second boundary 222, and the angle of the third boundary 223 of the around-view data 220 as a first reference angle (e.g., 56 degrees) and may change the angle of the fourth boundary 224, which is a boundary of the right and rear sides of the vehicle 1, to a third reference angle (e.g., 10 degrees).

While the vehicle 1 is moving backward, the driver assistance apparatus 100 may detect an obstacle 2 located at the rear of the vehicle 1 based on detection data of ultrasound sensors 121, 122, 123, and 124.

The driver assistance apparatus 100 may generate around-view data 220 such that a region of the rear image photographed by the second camera 112 in the around-view image is expanded based on the detection of the obstacle 2 located at the rear of the vehicle 1. For example, as shown in FIG. 8B, the driver assistance apparatus 100 maintains the angle of the first boundary 221 and the angle of the second boundary 222 of the around-view data 220 as a first reference angle (e.g., 56 degrees) and may change the angle of the third boundary 223 and the angle of the fourth boundary 224 of the rear of the vehicle 1 to a second reference angle (e.g., 80 degrees).

In addition, while the vehicle 1 is moving backward, the driver assistance apparatus 100 may generate around-view data 220 such that the area of the rear image in the around-view image is expanded based on the distance between the vehicle 1 and the obstacle 2.

For example, based on the obstacle 2 not being detected, as shown in FIG. 9A, the driver assistance apparatus 100 may correct the image data so that angles of the first, second, third, and fourth boundaries 221, 222, 223, and 224 of the around-view data 220 become a first reference angle (e.g., 56 degrees).

Based on a determination that the obstacle 2 is detected by the movement of the vehicle 1 and the distance to the obstacle 2 is greater than or equal to the reference distance, as shown in FIG. 9B, the driver assistance apparatus 100 may still correct the image data so that the angles of the first, second, third, and fourth boundaries 221, 222, 223, and 224 of the around-view data 220 become the first reference angle (e.g., 56 degrees).

Based on a determination that the obstacle 2 is detected by the movement of the vehicle 1 and the distance to the obstacle 2 is less than the reference distance, as shown in FIG. 9C, the driver assistance apparatus 100 may correct the image data so that the angles of the third and fourth boundaries 223 and 224 of the around-view data 220 become the second reference angle (e.g., 80 degrees).

Figure 10A:
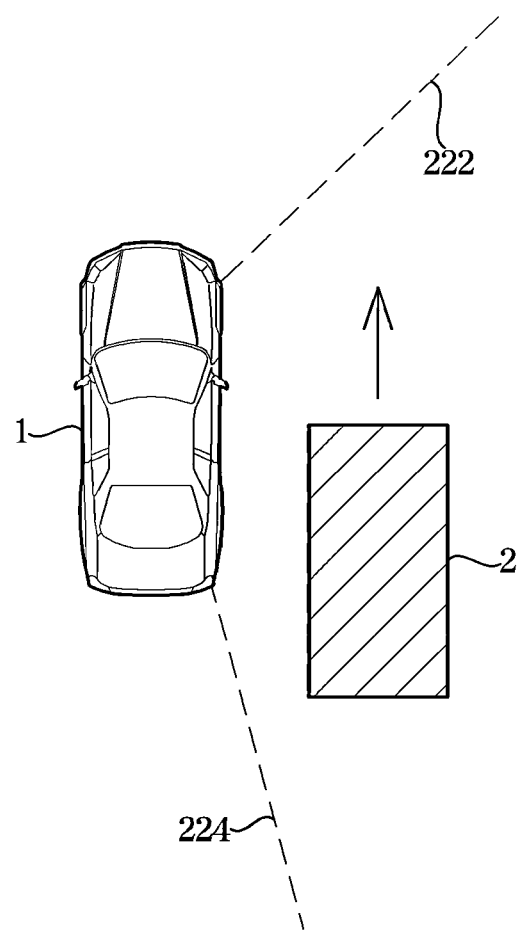
FIGS. 10A and 10B illustrate an example of around-view data generated by a driver assistance apparatus according to an embodiment while an obstacle is moving.
Figure 10B:
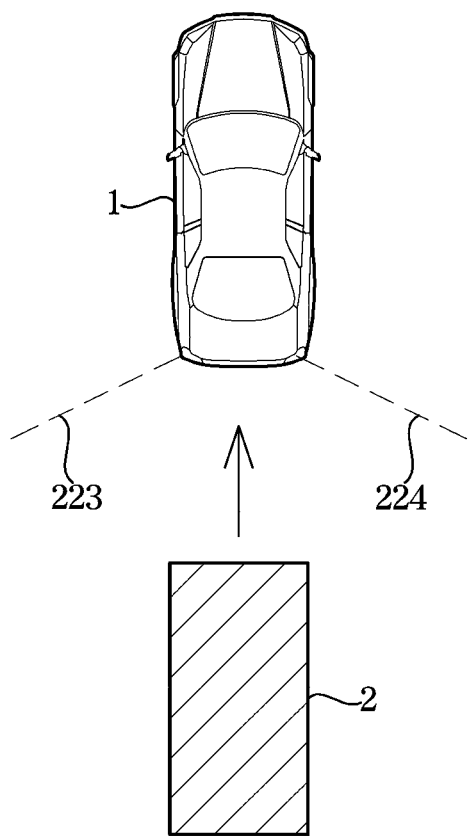
Figure 11A:
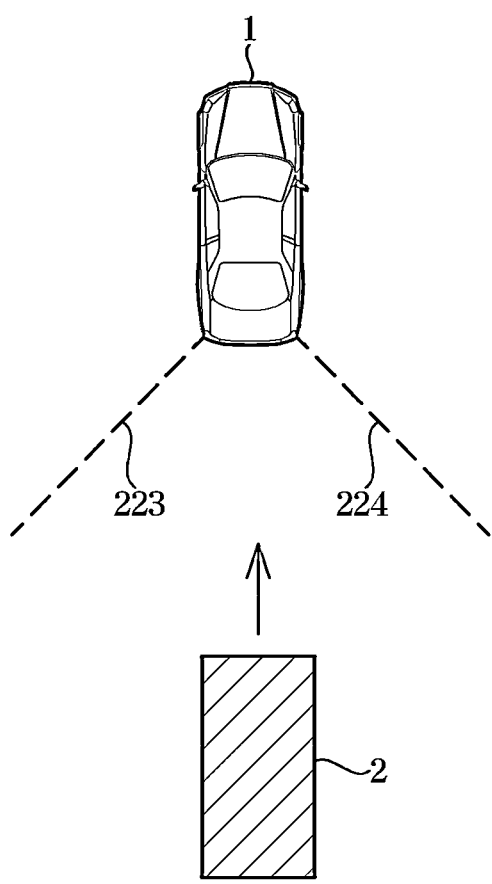
FIGS. 11A, 11B, and 11C illustrate an example of around-view data generated by a driver assistance apparatus according to an embodiment while an obstacle is moving.
Figure 11B:
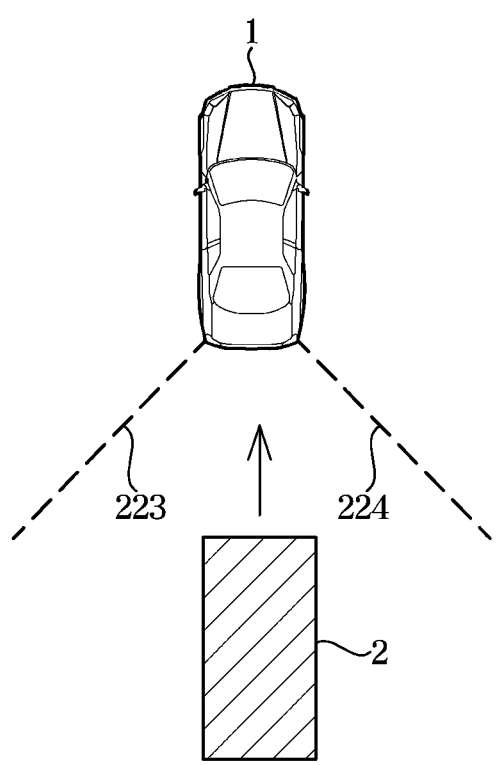
Figure 11C:
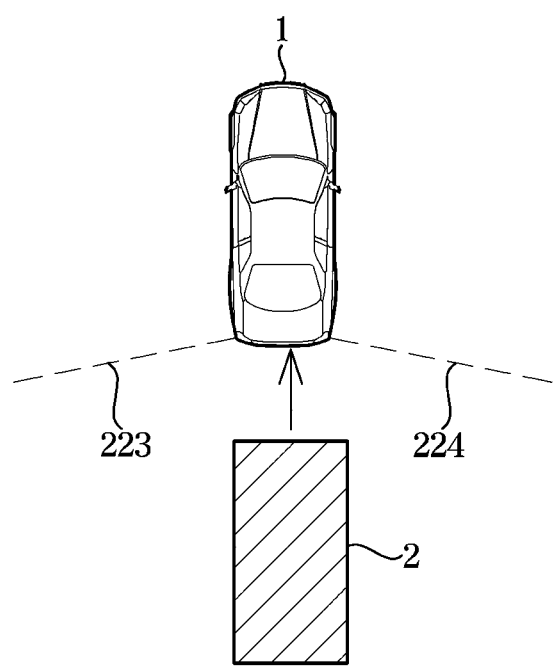

FIGS. 10A and 10B illustrate an example of around-view data generated by a driver assistance apparatus according to an embodiment while an obstacle is moving. FIGS. 11A, 11B, and 11C illustrate an example of around-view data generated by a driver assistance apparatus according to an embodiment while an obstacle is moving.

The driver assistance apparatus 100 may detect an obstacle 2 moving from the right rear side of the vehicle 1 based on detection data of the ultrasound sensors 121, 122, 123, and 124. The driver assistance apparatus 100 may change the angle of the fourth boundary 224 of the around-view data 220 to a third reference angle (e.g., 10 degrees) as shown in FIG. 10A based on detecting the obstacle 2 moving from the right rear side of the vehicle 1.

The driver assistance apparatus 100 may detect an obstacle 2 moving from the rear of the vehicle 1 based on detection data of the ultrasound sensors 121, 122, 123, and 124. The driver assistance apparatus 100 may change the angle of the third boundary 223 and the angle of fourth boundary 224 of the around-view data 220 to a second reference angle (e.g., 80 degrees) as shown in FIG. 10B based on detecting the obstacle 2 moving from the rear of the vehicle 1.

Also, while the obstacle 2 is moving toward the vehicle 1, the driver assistance apparatus 100 may generate around-view data 220 such that the area of the rear image in the around-view image is expanded based on the distance between the vehicle 1 and the obstacle 2.

For example, based on the obstacle 2 not being detected, as shown in FIG. 11A, the driver assistance apparatus 100 may correct the image data so that angles of the first, second, third, and fourth boundaries 221, 222, 223, and 224 of the around-view data 220 become a first reference angle (e.g., 56 degrees).

Based on a determination that the obstacle 2 is detected by the movement of the obstacle 2 and the distance to the obstacle 2 is greater than or equal to the reference distance, as shown in FIG. 11B, the driver assistance apparatus 100 may still correct the image data so that the angles of the first, second, third, and fourth boundaries 221, 222, 223, and 224 of the around-view data 220 become the first reference angle (e.g., 56 degrees).

Based on a determination that the obstacle 2 is detected and the distance to the obstacle 2 is less than the reference distance, as shown in FIG. 11C, the driver assistance apparatus 100 may correct the image data so that the angles of the third and fourth boundaries 223 and 224 of the around-view data 220 become the second reference angle (e.g., 80 degrees).

Figure 12A:
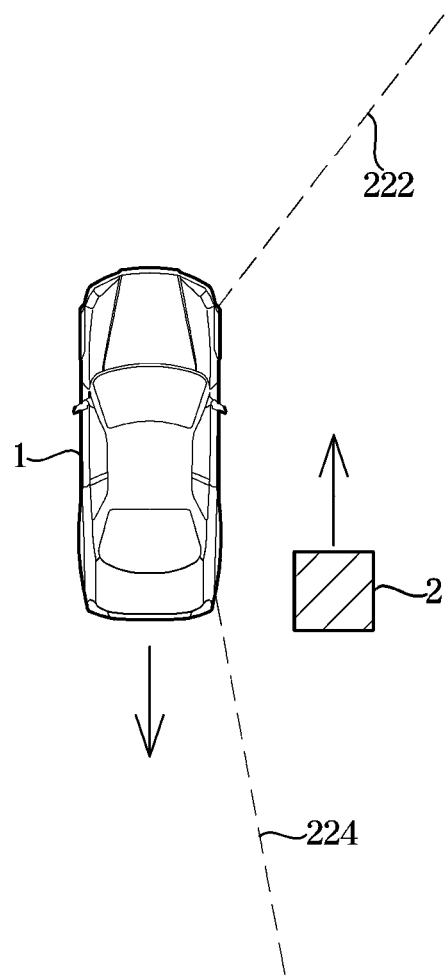
FIGS. 12A and 12B illustrate an example of around-view data generated by a driver assistance apparatus according to an embodiment while a vehicle and an obstacle are moving.
Figure 12B:
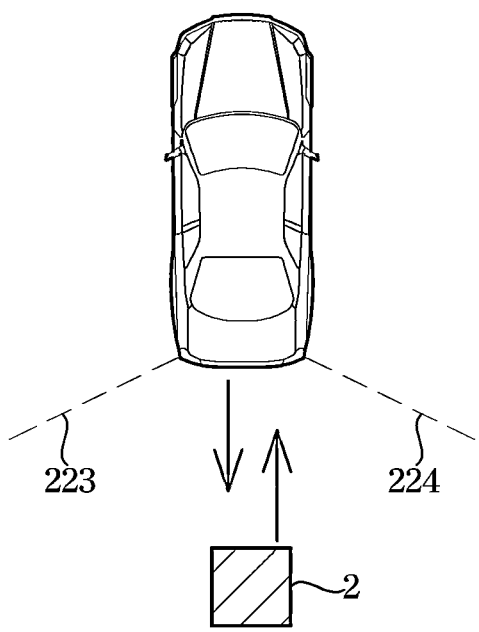

FIGS. 12A and 12B illustrate an example of around-view data generated by a driver assistance apparatus according to an embodiment while a vehicle and an obstacle are moving.

While the vehicle 1 is moving backward, the driver assistance apparatus 100 may detect an obstacle 2 located at the right rear side of the vehicle 1 based on detection data of ultrasound sensors 121, 122, 123, and 124. The driver assistance apparatus 100 may change the angle of the fourth boundary 224 of the around-view data 220 to a third reference angle (e.g., 10 degrees) as shown in FIG. 12A based on detecting the obstacle 2 moving from the right rear of the vehicle 1 moving backward.

While the vehicle 1 is moving backward, the driver assistance apparatus 100 may detect an obstacle 2 moving from the rear of the vehicle 1 based on detection data of the ultrasound sensors 121, 122, 123, and 124. The driver assistance apparatus 100 may change the angle of the third boundary 223 and the angle of the fourth boundary 224 of the around-view data 220 to a second reference angle (e.g., 80 degrees) as shown in FIG. 12B based on detecting the obstacle 2 moving from the right rear of the vehicle 1 moving backward.

Figure 13:
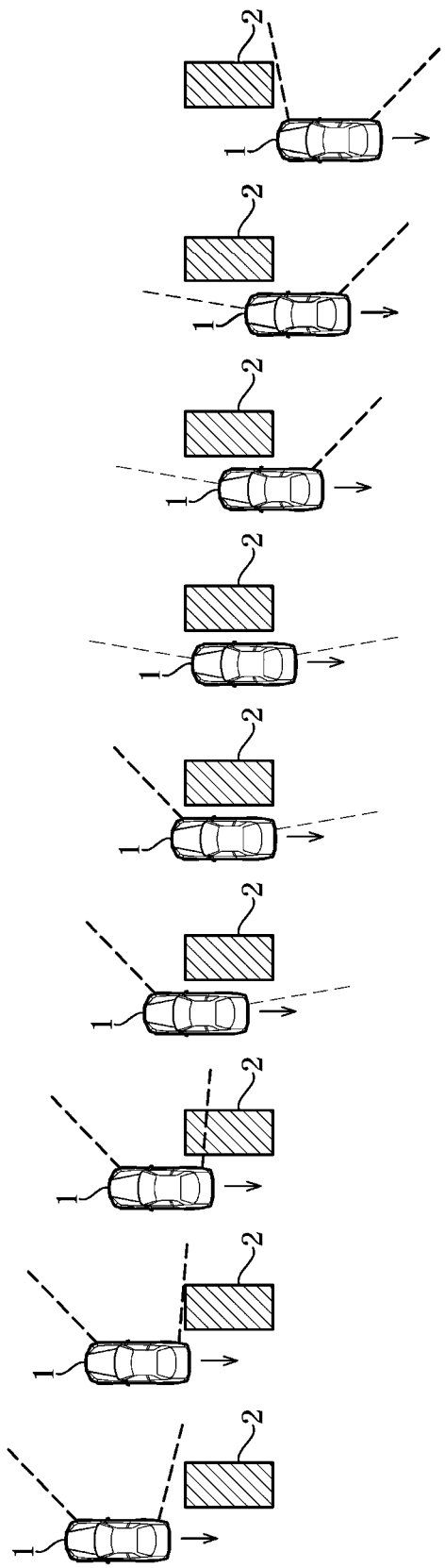
FIG. 13 illustrates an example of around-view data generated by a driver assistance apparatus according to an embodiment when a vehicle moves and an obstacle passes by the right side of a vehicle.

FIG. 13 illustrates an example of around-view data generated by a driver assistance apparatus according to an embodiment when a vehicle moves and an obstacle passes through the right side of a vehicle.

As shown in FIG. 13, the driver assistance apparatus 100 may set the angle of the fourth boundary 224 of the around-view data 220 as a second reference angle (e.g., 80 degrees) based on the detection of the obstacle 2 at the rear of the vehicle 1.

By the movement of the vehicle 1, the obstacle 2 can move from the rear of the vehicle 1 to the right side of the vehicle 1 through the right rear of the vehicle 1. The driver assistance apparatus 100 may change the angle of the fourth boundary 224 of the around-view data 220 to a third reference angle (e.g., 10 degrees) based on the detection of the obstacle of the right side of the vehicle 1.

By moving the vehicle 1, the obstacle 2 may move from the right side of the vehicle 1 to the right front side of the vehicle 1. The driver assistance apparatus 100 may change the angle of the second boundary 222 of the around-view data 220 to a third reference angle (e.g., 10 degrees) and change the angle of the fourth boundary 224 to the first reference angle (e.g., 56 degrees) based on the detection of the obstacle 2 of the right front side of the vehicle 1.

By the movement of the vehicle 1, the obstacle 2 can move to the front of the vehicle 1 through the right front of the vehicle 1. The driver assistance apparatus 100 may change the angle of the second boundary 222 of the around-view data 220 to a second reference angle (e.g., 80 degrees) based on the detection of the obstacle of the front of the vehicle 1.

As described above, while obstacle 2 passes through the right side of vehicle 1, the driver assistance apparatus 100 may change the angle of the second boundary 222 and the angle of the fourth boundary 224 of the around-view data 220 according to the location of the obstacle 2.

Figure 14:
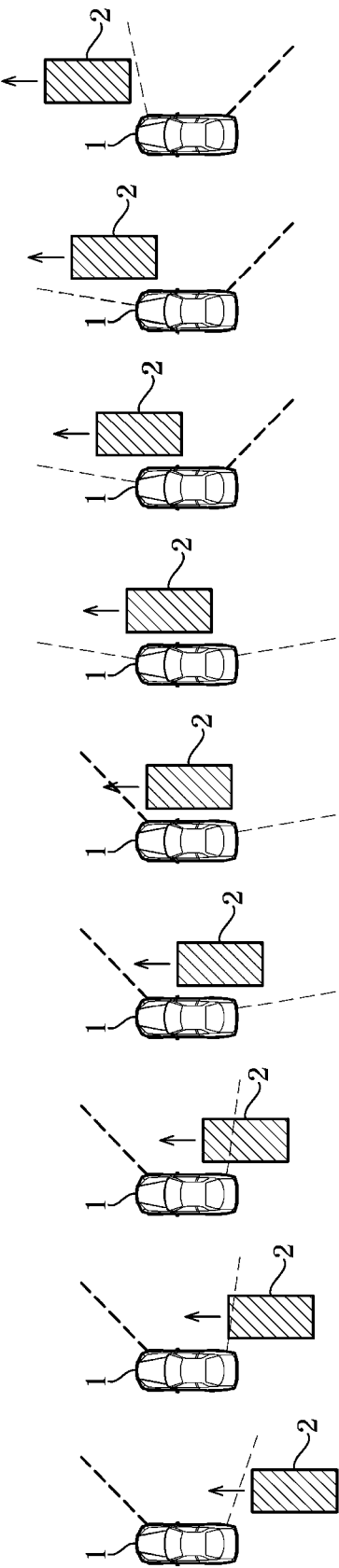
FIG. 14 illustrates an example of around-view data generated by a driver assistance apparatus according to an embodiment when an obstacle moves and an obstacle passes by the right side of a vehicle.

FIG. 14 illustrates an example of around-view data generated by a driver assistance apparatus according to an embodiment when an obstacle moves and an obstacle passes through the right side of a vehicle.

As shown in FIG. 14, the driver assistance apparatus 100 may set the angle of the fourth boundary 224 of the around-view data 220 as a second reference angle (e.g., 80 degrees) based on the detection of the obstacle 2 at the rear of the vehicle 1.

By the movement of the obstacle 2, the obstacle 2 can move from the rear of the vehicle 1 to the right side of the vehicle 1 through the right rear of the vehicle 1. The driver assistance apparatus 100 may change the angle of the fourth boundary 224 of the around-view data 220 to a third reference angle (e.g., 10 degrees) and then change to the first reference angle (e.g., 56 degrees).

By the movement of the obstacle 2, the obstacle 2 can move from the right side of the vehicle 1 to the front of the vehicle 1 through the right front side of the vehicle 1. The driver assistance apparatus 100 changes the angle of the second boundary 222 of the around-view data 220 to a third reference angle (e.g., 10 degrees) and then changes to a second reference angle (e.g., 80 degrees).

As described above, while obstacle 2 passes through the right side of vehicle 1, the driver assistance apparatus 100 may change the angle of the second boundary 222 and the angle of the fourth boundary 224 of the around-view data 220 according to the location of the obstacle 2.

Figure 15A:
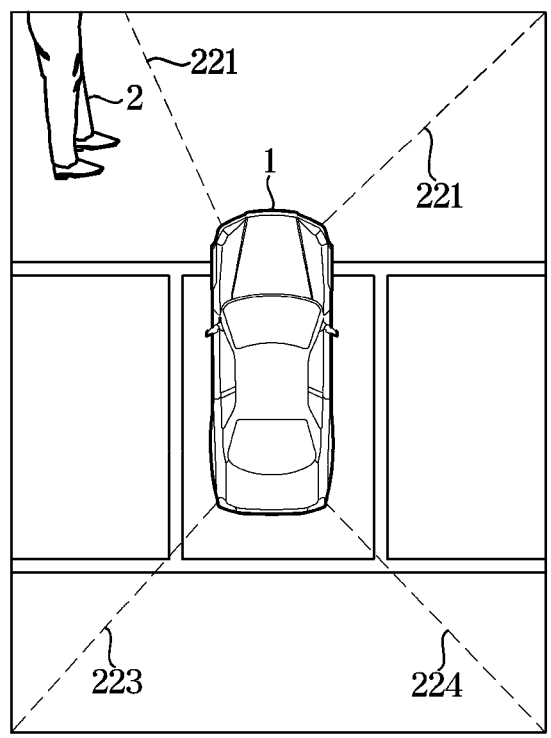
FIGS. 15A, 15B, and 15C illustrate an example of around-view data generated by a driver assistance apparatus according to an embodiment when an obstacle moves and an obstacle passes in front of a vehicle.
Figure 15B:
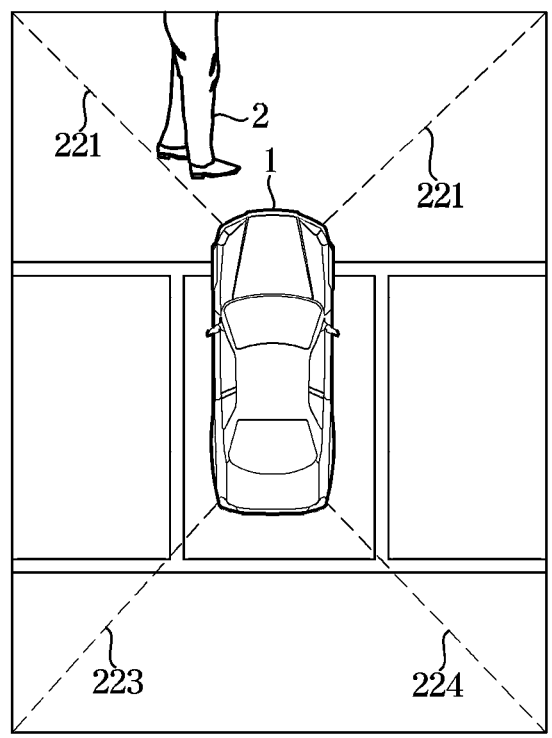
Figure 15C:
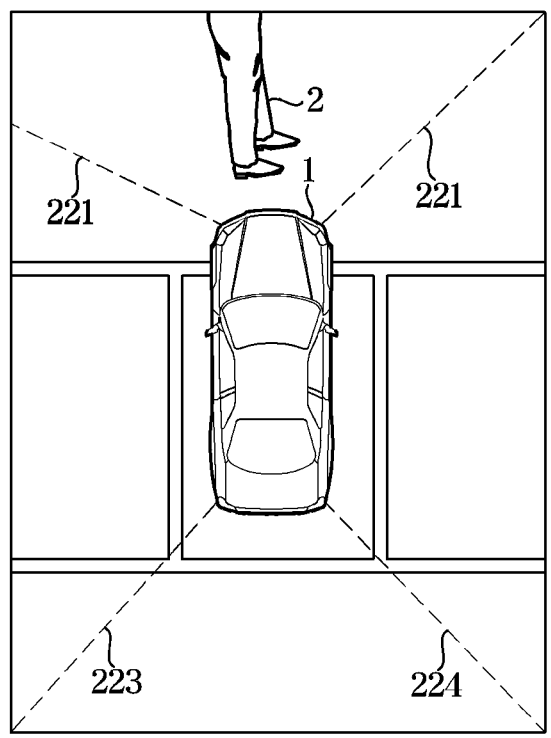

FIGS. 15A, 15B, and 15C illustrate an example of around-view data generated by a driver assistance apparatus according to an embodiment when an obstacle moves and an obstacle passes in front of a vehicle.

As shown in FIGS. 15A, 15B, and 15C, the driver assistance apparatus 100 may set the angle of the first boundary 221 of the around-view data 220 to a third reference angle (e.g., 10 degrees) based on the detection of the obstacle 2 of the left side of the vehicle 1.

By the movement of the obstacle 2, the obstacle 2 can move from the left side of the vehicle 1 to the front of the vehicle 1 through the front left side of the vehicle 1.

Based on a determination that the obstacle 2 is detected from the left front side of the vehicle 1, the driver assistance apparatus 100 may change the angle of the first boundary 221 of the around-view data 220 to a first reference angle (e.g., 56 degrees).

Thereafter, based on a determination that the obstacle 2 is detected from the front of the vehicle 1, the driver assistance apparatus 100 may change the angle of the first boundary 221 of the around-view data 220 to a second reference angle (e.g., 80 degrees).

As described above, while the obstacle 2 passes through the front of the vehicle 1, the driver assistance apparatus 100 may change the angle of the first boundary 221 of the around-view data 220 according to the location of the obstacle 2.

Figure 16A:
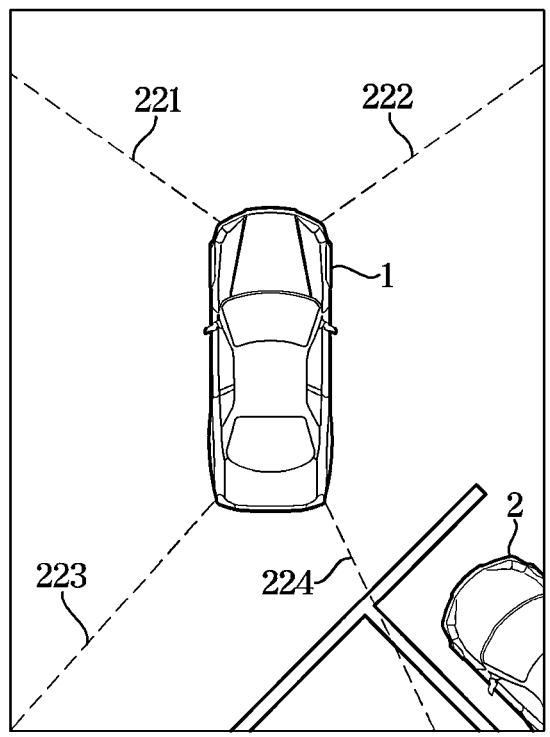
FIGS. 16A, 16B, and 16C illustrate an example of around-view data generated by a driver assistance apparatus according to an embodiment while a vehicle is parked.
Figure 16B:
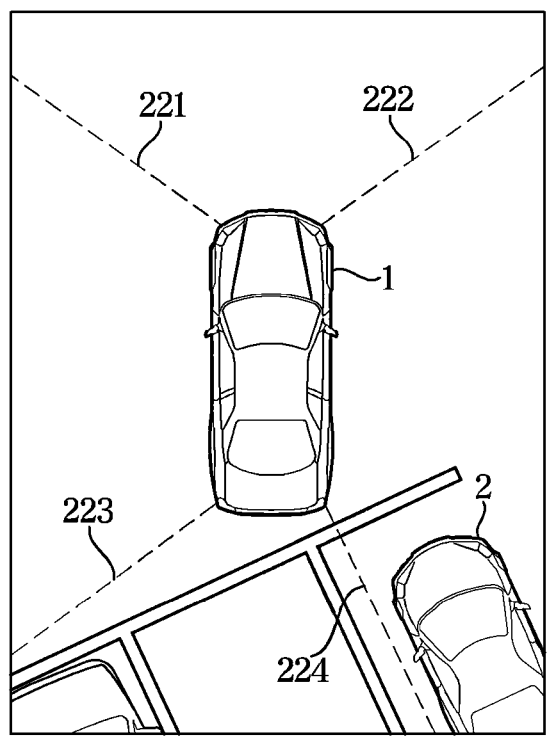
Figure 16C:
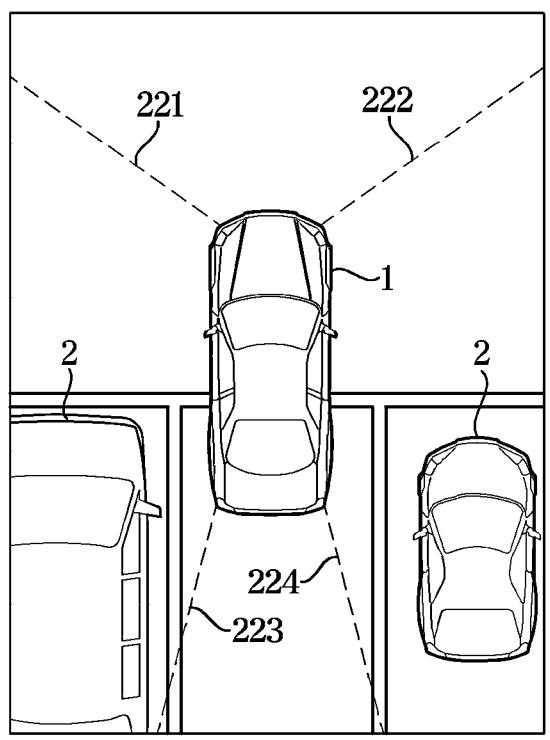

FIGS. 16A, 16B, and 16C illustrates an example of around-view data generated by a driver assistance apparatus according to an embodiment while a vehicle is parked.

As shown in FIGS. 16A, 16B, and 16C, while vehicle 1 is parked, the driver assistance apparatus 100 may set the angle of the third boundary 223 of the around-view data 220 to a first reference angle (e.g., 56 degrees) and set the angle of the fourth boundary 224 of the around-view data 220 to a third reference angle (e.g., 10 degrees) based on a determination that the obstacle 2 is detected from the right side of the vehicle 1.

While vehicle 1 is parked, the driver assistance apparatus 100 may change the angle of the third boundary 223 of the around-view data 220 to a second reference angle (e.g., 80 degrees) based on a determination that the another obstacle 2 is detected from the left rear side of the vehicle 1.

While vehicle 1 is parked, the driver assistance apparatus 100 may change the angle of the third boundary 223 of the around-view data 220 to a third reference angle (e.g., 10 degrees) based on a determination that the another obstacle 2 is detected from the left side of the vehicle 1.

As described above, while vehicle 1 perform rear parking, the driver assistance apparatus 100 may change the angle of the third boundary 223 and the angle of the fourth boundary 224 of the around-view data 220 according to the location of the obstacle 2.

Figure 17:
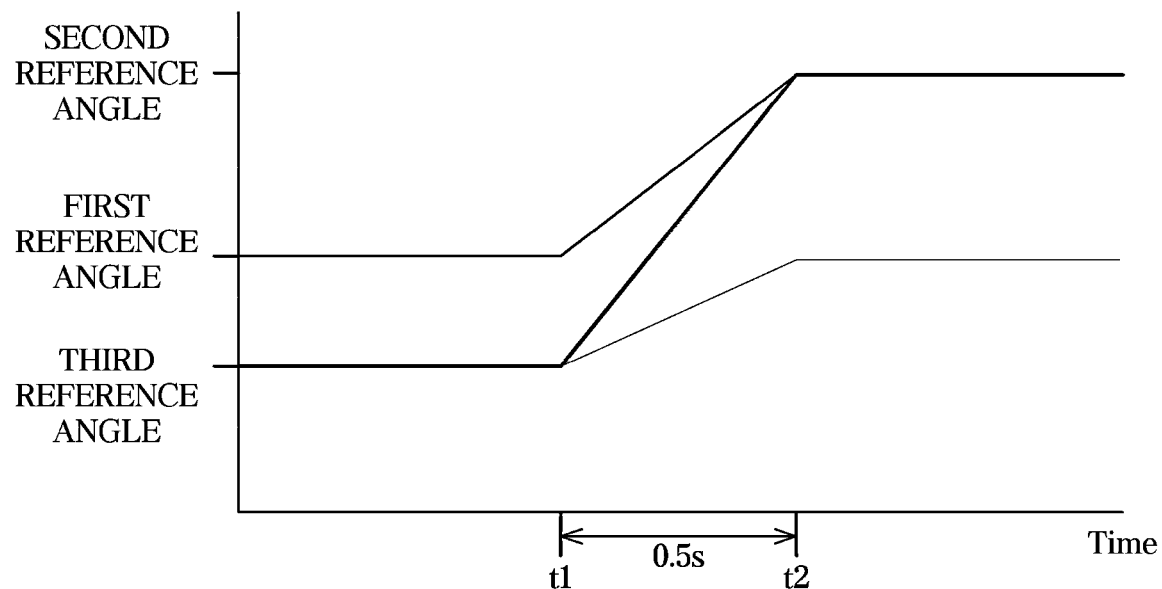
FIG. 17 illustrates an example of changing boundaries of around-view data of a driver assistance apparatus according to an embodiment.

FIG. 17 illustrates an example of changing boundaries of around-view data of a driver assistance apparatus according to an embodiment.

The driver assistance apparatus 100 may change the angle of the boundaries 221, 222, 223, and 224 combining the top-view data 211, 212, 213, and 214 to generate the around-view data 220. For example, the driver assistance apparatus 100 may change the angles of the boundaries 221, 222, 223, and 224 from a first reference angle (e.g., 56 degrees) to a second reference angle (e.g., 80 degrees) or change from a third reference angle (e.g., 10 degrees) to a second reference angle.

At this time, as shown in FIG. 17, the angles of the boundaries 221, 222, 223, and 224 of the around-view data 220 may be changed gradually or stepwise between a predetermined time intervals (between the first time t1 and the second time t2). For example, the driver assistance apparatus 100 may change the angles of the boundaries 221, 222, 223, and 224 of the around-view data 220 gradually or stepwise within 0.5 seconds.

Figure 18:
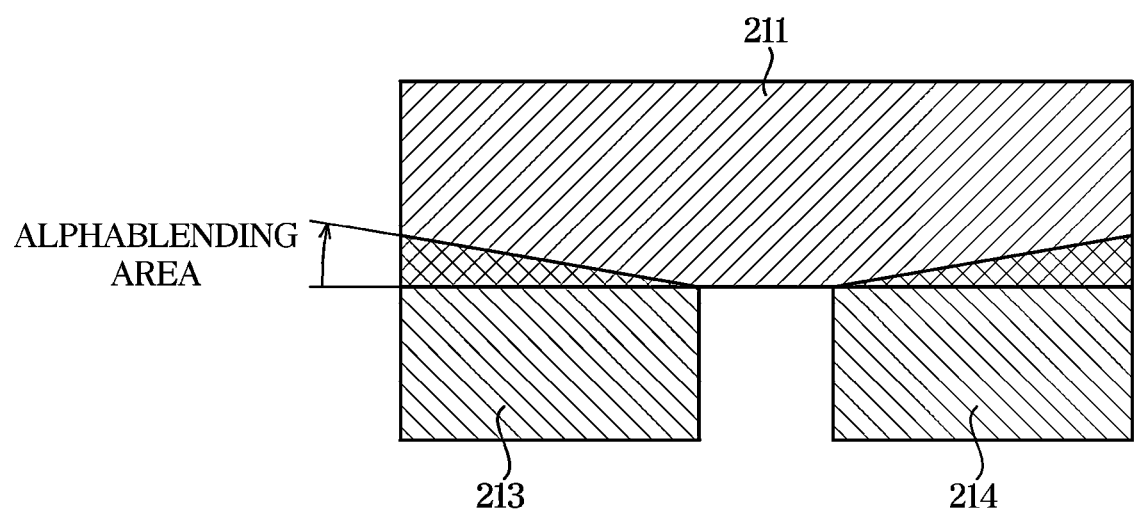
FIG. 18 illustrates a change in an image at boundaries of around-view data of a driver assistance apparatus according to an embodiment.

FIG. 18 illustrates a change in an image at boundaries of around-view data of a driver assistance apparatus according to an embodiment.

The driver assistance apparatus 100 may combine the top-view data 211, 212, 213, and 214 to generate the around-view data 220. The top-view data 211, 212, 213, and 214 may be changed gradually or stepwise at the combined boundaries 221, 222, 223, 224 and the image data may be changed gradually or stepwise within a predetermined area. For example, the driver assistance apparatus 100 may change the top-view data gradually or stepwise within a range of about 5 degrees with respect to the inner contact point of the top-view data.

As shown 18, the first top-view data 211 may be combined with the third top-view data 213. In this case, the first top-view data 211 may become transparent gradually within a range of about 5 degrees with respect to the first boundary 221 in contact with the third top-view data 213. In addition, the third top-view data 213 may also become transparent gradually within a range of about 5 degrees with respect to the first boundary 221. Accordingly, the around-view image may be naturally changed from the first top-view image to the third top-view image at the first boundary 221.

Figure 19:
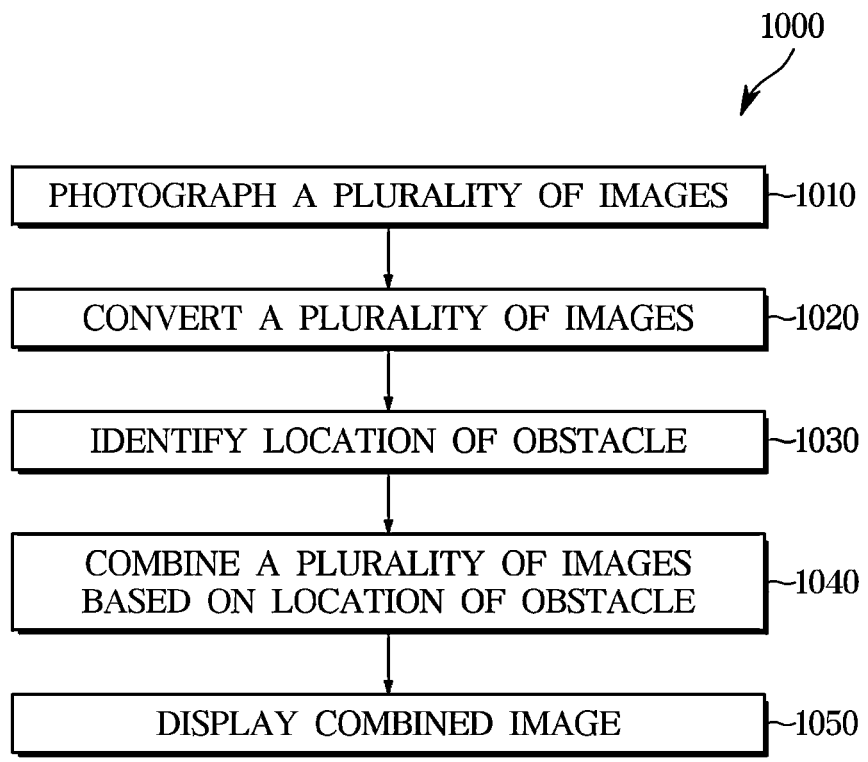
FIG. 19 illustrates a method of generating around-view data by a driver assistance apparatus according to an embodiment.

FIG. 19 illustrates a method of generating around-view data by a driver assistance apparatus according to an embodiment.

Referring to FIG. 19, a method 1000 in which the driver assistance apparatus 100 generates around-view data is described.

The vehicle 1 photographs a plurality of images (1010).

The driver assistance apparatus 100 may acquire a plurality of image data 201, 202, 203, and 204 through the plurality of cameras 111, 112, 113, and 114.

The vehicle 1 converts a plurality of images (1020).

The driver assistance apparatus 100 may convert a plurality of image data 201, 202, 203, and 204 into a plurality of top-view data 211, 212, 213, and 214.

The vehicle 1 identifies the position of the obstacle (1030).

The driver assistance apparatus 100 may acquire a plurality of detection data through the plurality of ultrasound sensors 121, 122, 123, and 124.

The vehicle (1) combines a plurality of converted images based on the position of the obstacle (1040).

The driver assistance apparatus 100 may set angles of boundaries for combining the top-view data 211, 212, 213, and 214 based on the position of the obstacle.

The driver assistance apparatus 100 cuts the top-view data 211, 212, 213, and 214 according to the angles of set boundaries and may generate the around-view data 220 by combining the cut top-view data 211, 212, 213, and 214.

The vehicle 1 displays the combined image (1050).

The driver assistance apparatus 100 may provide the around-view data 220 to the display 10 to display the around-view data 220, and the display 10 may display the around-view data 220.

According to one aspect of the present disclosure, it is possible to provide a driver assistance apparatus, a vehicle, and a method of controlling a vehicle that can display an image of a surrounding without distortion of a surrounding obstacle during parking.

Embodiments of the present disclosure have been described above. In the embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While embodiments have been described with respect to a limited number of embodiments, those having ordinary skill in the art, having the benefit of this disclosure, should appreciate that other embodiments can be devised and do not depart from the scope as disclosed herein. Accordingly, the scope should be limited only by the attached claims.

What is claimed is:

1. A vehicle comprising:
a first camera mounted on the vehicle to have a first field of view facing a front or rear of the vehicle and configured to acquire first image data;
a second camera mounted on the vehicle to have a second field of view facing a left side or a right side of the vehicle and configured to acquire second image data;
a display; and
a controller, wherein the controller is configured to
display first around-view data in which the first image data and the second image data are combined so that a boundary between the first image data and the second image data becomes a first reference angle on the display, and
combine the first image data and the second image data so that an angle between the boundary and a driving direction of the vehicle becomes a second reference angle greater than the first reference angle based on an opening of a vehicle door.

2. The vehicle of claim 1, wherein the controller is configured to combine the first image data and the second image data so that the angle between the boundary and the driving direction of the vehicle becomes a third reference angle less than the first reference angle based on a driving speed of the vehicle being equal to or greater than a reference speed.

3. The vehicle of claim 1, wherein the controller is configured to combine the first image data and the second image data so that an area occupied by the first image data in the first around-view data is expanded based on an obstacle located in the first field of view.

4. The vehicle of claim 1, wherein the controller is configured to combine the first image data and the second image data so that an area occupied by the second image data in second around-view data is expanded based on an obstacle located in the second field of view.

5. The vehicle of claim 1, wherein:
the first camera has the first field of view facing a first direction;
the second camera has the second field of view facing a second direction; and
the controller is configured to combine the first image data and the second image data so that the boundary faces the second direction based on an obstacle located in the first field of view.

6. The vehicle of claim 1, wherein:
the first camera has the first field of view facing a first direction;
the second camera has the second field of view facing a second direction; and
the controller is configured to combine the first image data and the second image data so that the boundary faces the first direction based on an obstacle located in the second field of view.

7. The vehicle of claim 1, wherein the controller is configured to combine the first image data and the second image data so that the angle between the boundary and the driving direction of the vehicle becomes the second reference angle greater than the first reference angle based on an obstacle located in front or rear of the vehicle.

8. The vehicle of claim 1, wherein the controller is configured to combine the first image data and the second image data so that the angle between the boundary and the driving direction of the vehicle becomes a third reference angle less than the first reference angle based on an obstacle located on the right side or the left side of the vehicle.

9. The vehicle of claim 1, wherein the controller is configured to combine the first image data and the second image data so that the angle between the boundary and the driving direction of the vehicle becomes the second reference angle less than the first reference angle based on an opening of a trunk gate or trunk lid of the vehicle.

10. The vehicle of claim 1, further comprising:
a first ultrasound sensor mounted on the vehicle to have a first detection area overlapping the first field of view and configured to detect an obstacle; and
a second ultrasound sensor mounted on the vehicle to have a second detection area overlapping the second field of view and configured to detect the obstacle.

11. The vehicle of claim 10, wherein the controller is configured to combine the first image data and the second image data so that an area occupied by the first image data in second around-view data is expanded when the obstacle is detected by the first ultrasound sensor.

12. The vehicle of claim 10, wherein the controller is configured to combine the first image data and the second image data so that an area occupied by the second image data in second around-view data is expanded when the obstacle is detected by the second ultrasound sensor.

13. The vehicle of claim 10, wherein the first ultrasound sensor has a first detection area facing a front or rear of the vehicle, and wherein the second ultrasound sensor has a second detection area facing the left side or the right side of the vehicle.

14. The vehicle of claim 10, wherein the controller is configured to combine the first image data and the second image data so that the angle between the boundary and the driving direction of the vehicle becomes the second reference angle greater than the first reference angle when the obstacle is detected by the first ultrasound sensor.

15. The vehicle of claim 10, wherein the controller is configured to combine the first image data and the second image data so that the angle between the boundary and the driving direction of the vehicle becomes a third reference angle less than the first reference angle when the obstacle is detected by the second ultrasound sensor.

16. A vehicle comprising:
a first camera mounted on the vehicle to have a first field of view facing a front or rear of the vehicle and configured to acquire first image data;
a second camera mounted on the vehicle to have a second field of view facing a left side or a right side of the vehicle and configured to acquire second image data;
a display; and
a controller, wherein the controller is configured to
display first around-view data in which the first image data and the second image data are combined so that a boundary between the first image data and the second image data becomes a first reference angle on the display, and
combine the first image data and the second image data so that an angle between the boundary and a driving direction of the vehicle becomes a second reference angle less than the first reference angle based on an opening of a trunk lid or trunk gate of the vehicle.

17. The vehicle of claim 16, wherein the controller is configured to combine the first image data and the second image data so that the angle between the boundary and the driving direction of the vehicle becomes the second reference angle less than the first reference angle based on a driving speed of the vehicle being equal to or greater than a reference speed.

18. The vehicle of claim 16, wherein the controller is configured to:
determine an obstacle is located nearby the vehicle within a view of the first camera and/or the second camera; and
in response to the determination, display the first around-view data in which the first image data and the second image data are combined so that the boundary between the first image data and the second image data becomes the second reference angle on the display based on the obstacle located nearby the vehicle.

19. The vehicle of claim 18, wherein the controller is configured to combine the first image data and the second image data so that an area occupied by the first image data in the first around-view data is expanded based on the obstacle located in the first field of view.

* * * * *